(12) United States Patent
Wang et al.

(10) Patent No.: US 12,205,034 B2
(45) Date of Patent: Jan. 21, 2025

(54) METHOD, ELECTRONIC DEVICE, AND COMPUTER PROGRAM PRODUCT FOR DATA PROCESSING UTILIZING SEPARABLE MULTI-STAGE DATA PROCESSING MODEL IN EDGE-CLOUD NETWORK

(71) Applicant: EMC IP Holding Company LLC, Hopkinton, MA (US)

(72) Inventors: Zijia Wang, WeiFang (CN); Jiacheng Ni, Shanghai (CN); Qiang Chen, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 924 days.

(21) Appl. No.: 17/230,460

(22) Filed: Apr. 14, 2021

(65) Prior Publication Data

US 2022/0292361 A1    Sep. 15, 2022

(30) Foreign Application Priority Data

Mar. 15, 2021  (CN) .......................... 202110274593.0

(51) Int. Cl.
*G06N 3/082*        (2023.01)
*G06F 40/30*        (2020.01)

(52) U.S. Cl.
CPC .............. *G06N 3/082* (2013.01); *G06F 40/30* (2020.01)

(58) Field of Classification Search
CPC ...... G06N 3/082; G06N 3/045; G06N 3/0495; G06F 40/30; G06F 40/20; G06F 9/5027
See application file for complete search history.

(56) References Cited

U.S. PATENT DOCUMENTS

| 10,878,318 B2* | 12/2020 | Sharifi | G06N 3/045 |
| 11,689,607 B2* | 6/2023 | Pei | G06N 3/063 |
| | | | 382/100 |
| 2022/0414432 A1* | 12/2022 | Banitalebi Dehkordi | ................... |
| | | | G06N 3/048 |

OTHER PUBLICATIONS

Zhang et al., "A Transfer Learning-Based High Impedance Fault Detection Method Under a Cloud-Edge Collaboration Framework" IEEE. (Year: 2020).*

(Continued)

*Primary Examiner* — Randall K. Baldwin
(74) *Attorney, Agent, or Firm* — Ryan, Mason & Lewis, LLP

(57) ABSTRACT

Embodiments of the present disclosure provide a method, an electronic device, and a computer program product for data processing. In a method for data processing, a first electronic device processes data based on a first data processing model to generate an initial result. A data size of the initial result is smaller than a data size of the data. The first electronic device sends the initial result to a second electronic device. The initial result is adjusted at the second electronic device and based on a second data processing model to generate an adjusted result. The second electronic device has more computing resources than the first electronic device, the second data processing model occupies more computing resources than the first data processing model, and an accuracy of the adjusted result is higher than that of the initial result.

19 Claims, 10 Drawing Sheets

(56) References Cited

OTHER PUBLICATIONS

Chen, Jiasi, and Xukan Ran. "Deep learning with edge computing: A review." Proceedings of the IEEE 107.8 (2019): 1655-1674. (Year: 2019).*
Wang, Xiaofei, et al. "Convergence of edge computing and deep learning: A comprehensive survey." IEEE Communications Surveys & Tutorials 22.2 (2020): 869-904. (Year: 2020).*
C. Buciluă et al., "Model Compression," Proceedings of the 12th ACM SIGKDD International Conference on Knowledge Discovery and Data Mining, Aug. 2006, 7 pages.
P. Ganesh, "Deep Learning—Model Optimization and Compression: Simplified," https://towardsdatascience.com/machine-learning-models-compression-and-quantization-simplified-a302ddf326f2, Jun. 24, 2019, 7 pages.
M. S. Z. Rizvi, "A Comprehensive Guide to Build your own Language Model in Python," https://www.analyticsvidhya.com/blog/2019/08/comprehensive-guide-language-model-nlp-python-code/, Aug. 8, 2019, 34 pages.
J. Brownlee, "Gentle Introduction to Statistical Language Modeling and Neural Language Models," https://machinelearningmastery.com/statistical-language-modeling-and-neural-language-models/, Aug. 7, 2019, 12 pages.
L. Wu et al., "Visual Language Modeling for Image Classification," Proceedings of the International Workshop on Multimedia Information Retrieval, Sep. 28-29, 2007, pp. 115-124.

\* cited by examiner ial result. The method further includes: sending the initial result to a

METHOD, ELECTRONIC DEVICE, AND COMPUTER PROGRAM PRODUCT FOR DATA PROCESSING UTILIZING SEPARABLE MULTI-STAGE DATA PROCESSING MODEL IN EDGE-CLOUD NETWORK

RELATED APPLICATION(S)

The present application claims priority to Chinese Patent Application No. 202110274593.0, filed Mar. 15, 2021, and entitled "Method, Electronic Device, and Computer Program Product for Data Processing," which is incorporated by reference herein in its entirety.

FIELD

Embodiments of the present disclosure generally relate to information technologies and computer technologies, and more particularly, to a method, an electronic device, and a computer program product for data processing.

BACKGROUND

In order to execute complex data processing tasks on devices having low processing capacities (e.g., edge devices in cloud computing scenarios), it is often necessary to deploy large data processing models on these low-capacity devices. However, limited computing resources or other resources of the low-capacity devices will cause processing time (e.g., inference time) of the models to be very long, thus resulting in a failure to deploy large models using these devices in daily life.

Therefore, some researchers begin to compress the models, e.g., by balancing between accuracy (or precision) and occupied computing resources (or spaces) of the models. Although some methods have been presented in some studies to minimize the accuracy loss during model compression, sometimes these methods still fail to guarantee that the compressed models have satisfactory accuracy due to hard limits of the low-capacity devices. The final result is that these large models cannot be used on the low-capacity devices.

SUMMARY

Embodiments of the present disclosure present a technical solution using separate two stage data processing models. More specifically, the embodiments of the present disclosure provide a method, an electronic device, and a computer program product for data processing.

In a first aspect of the present disclosure, a method for data processing is provided. The method includes: processing data at a first electronic device and based on a first data processing model to generate an initial result, a data size of the initial result being smaller than a data size of the data. The method further includes: sending the initial result to a second electronic device, the initial result being adjusted at the second electronic device and based on a second data processing model to generate an adjusted result, where the second electronic device has more computing resources than the first electronic device, the second data processing model occupies more computing resources than the first data processing model, and an accuracy of the adjusted result is higher than that of the initial result.

In a second aspect of the present disclosure, a method for data processing is provided. The method includes: receiving, at a second electronic device and from a first electronic device, an initial result generated through processing data by the first electronic device based on a first data processing model, a data size of the initial result being smaller than a data size of the data. The method further includes: adjusting the initial result based on a second data processing model to generate an adjusted result, where the second electronic device has more computing resources than the first electronic device, the second data processing model occupies more computing resources than the first data processing model, and an accuracy of the adjusted result is higher than that of the initial result.

In a third aspect of the present disclosure, a first electronic device is provided. The first electronic device includes at least one processor and at least one memory storing computer program instructions. The at least one memory and the computer program instructions are configured to cause, together with the at least one processor, the first electronic device to: process data based on a first data processing model to generate an initial result, a data size of the initial result being smaller than a data size of the data. The at least one memory and the computer program instructions are further configured to cause, together with the at least one processor, the first electronic device to: send the initial result to a second electronic device, the initial result being adjusted at the second electronic device and based on a second data processing model to generate an adjusted result, where the second electronic device has more computing resources than the first electronic device, the second data processing model occupies more computing resources than the first data processing model, and an accuracy of the adjusted result is higher than that of the initial result.

In a fourth aspect of the present disclosure, a second electronic device is provided. The second electronic device includes at least one processor and at least one memory storing computer program instructions. The at least one memory and the computer program instructions are configured to cause, together with the at least one processor, the second electronic device to: receive, from a first electronic device, an initial result generated through processing data by the first electronic device based on a first data processing model, a data size of the initial result being smaller than a data size of the data. The at least one memory and the computer program instructions are further configured to cause, together with the at least one processor, the second electronic device to: adjust the initial result based on a second data processing model to generate an adjusted result, where the second electronic device has more computing resources than the first electronic device, the second data processing model occupies more computing resources than the first data processing model, and an accuracy of the adjusted result is higher than that of the initial result.

In a fifth aspect of the present disclosure, a computer program product is provided. The computer program product is tangibly stored on a non-volatile computer-readable medium and includes machine-executable instructions. The machine-executable instructions, when executed, cause a machine to execute steps of the method according to the first aspect.

In a sixth aspect of the present disclosure, a computer program product is provided. The computer program product is tangibly stored on a non-volatile computer-readable medium and includes machine-executable instructions. The machine-executable instructions, when executed, cause a machine to execute steps of the method according to the second aspect.

It should be understood that the content described in this Summary is neither intended to limit key or essential features of the embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions below with reference to the accompanying drawings, the above and other objectives, features, and advantages of embodiments of the present disclosure will become readily understood. In the accompanying drawings, several embodiments of the present disclosure are shown by way of example and not limitation.

Throughout the accompanying drawings, the same or similar reference numerals are used to indicate the same or similar components.

DETAILED DESCRIPTION

Figure 1:
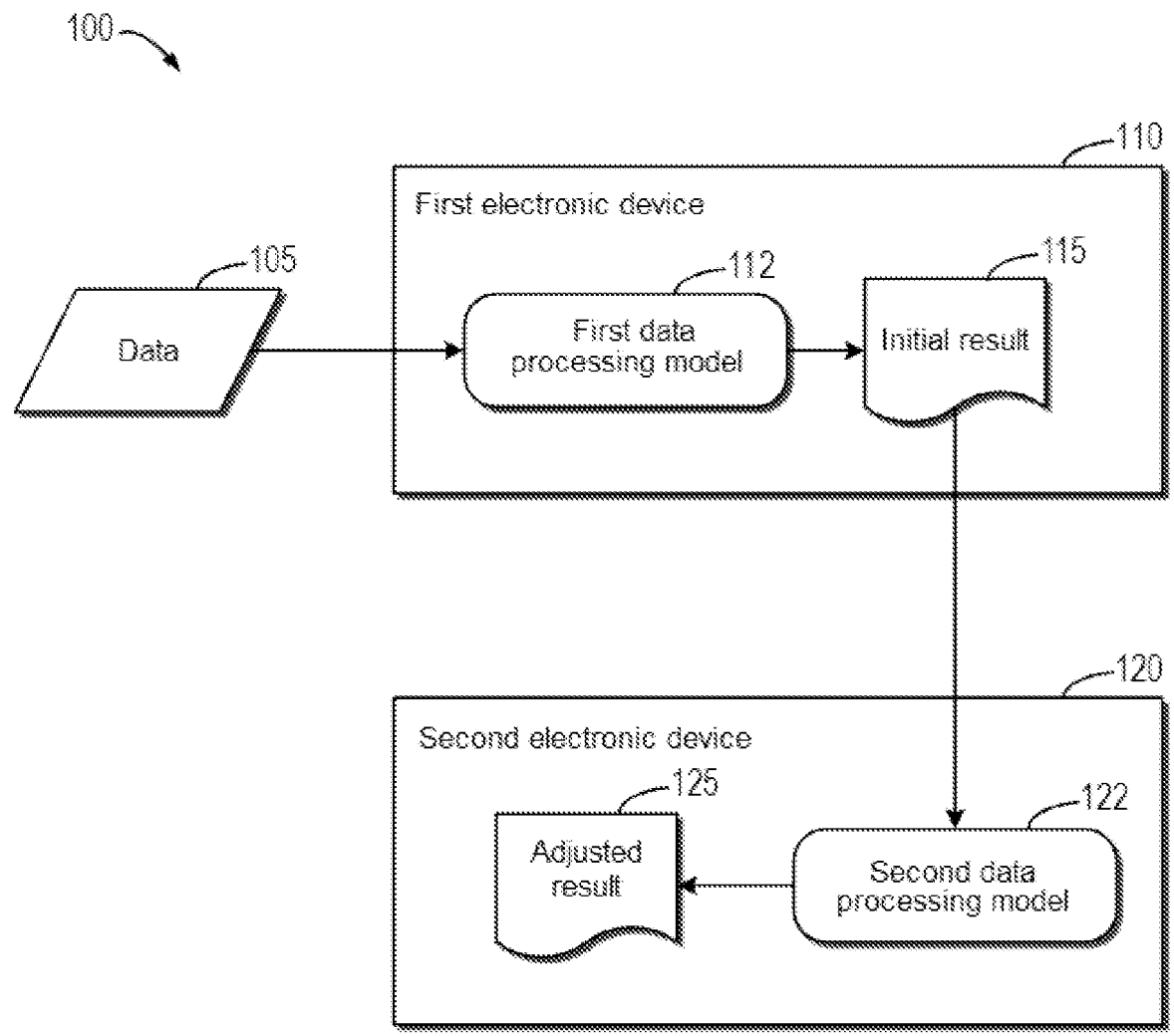
FIG. 1 shows a schematic diagram of an example data processing environment in which an embodiment of the present disclosure may be implemented.

The principles and spirit of the present disclosure will be described below with reference to some example embodiments shown in the accompanying drawings. It should be understood that these embodiments are described merely to enable those skilled in the art to better understand and implement the present disclosure, and are not intended to impose any limitation to the scope of the present disclosure. In the descriptions and claims herein, unless otherwise defined, all technical terms and scientific terms used herein have the same meaning as commonly understood by those of ordinary skills in the art to which the present disclosure belongs.

As mentioned above, large data processing models cannot be used on low-capacity devices. Offloading a large model or a complex operation to a cloud and fine-adjustment are two possible methods for deploying a large model on a low-capacity device. However, these methods usually have their own disadvantages, which will result in new problems, and current fine-adjusting algorithms only focus on fine-adjustment of a model during model compression. The present inventors have analyzed and studied these problems in many aspects, which are detailed as follows.

The first aspect to consider is model distribution. When selecting to offload a model to a cloud, it is necessary to pay attention to the problem of data transfer between the low-capacity device and the cloud. There is no general principle for the offloading model, and many factors need to be considered. These factors may change for different application scenarios.

The second aspect to consider is accuracy redundancy of the model. In a complex data processing task, some portions of the model may not need to be very accurate, and at present, no algorithm is presented to solve the accuracy redundancy problem.

The third aspect to consider is model compression loss. Due to limited computing resources on the low-capacity device, the compression loss is inevitable in these scenarios. At present, most studies focus on how to minimize the loss in the compression process, but no solution realizes that adding a new model may also be helpful. However, directly adding a new model to compensate for the compression loss will cause a new problem. It is believed that there is currently no good solution to this problem.

The last aspect to consider is generalization. The generalization of an algorithm is not irrelevant. An algorithm may be caused to be more generalized by finding shared characteristics and solving the problem at a high level. At present, a model compression algorithm focused on improving the performance in the compression process has been fully generalized, but if the object is to add a new model to finely adjust the result, it may be difficult to generalize the model compression algorithm.

In view of the above, embodiments of the present disclosure present a technical solution using separate two stage data processing models. In the technical solution, a first data processing model occupying fewer computing resources is deployed in a first electronic device having a lower processing capacity (having fewer computing resources), while a second data processing model occupying more computing resources is deployed in a second electronic device having a stronger processing capacity (having more computing resources). The first data processing model processes data to obtain an initial result, which has low accuracy but smaller data size compared with the processed data. Therefore, instead of sending original data, the first electronic device sends the initial result to the second electronic device, thereby shortening a transmission delay between the two stage data processing models. The second data processing model adjusts the initial result to provide an adjusted result having a higher accuracy. Thus, the embodiments of the present disclosure avoid balancing between a model size of a single model and an accuracy of a processing result by using separate two stage models, and minimize the transmission delay between the two stage models, thereby optimizing the data processing performance of the data processing model. Some example embodiments of the present disclosure will be described below with reference to the accompanying drawings.

FIG. 1 shows a schematic diagram of example data processing environment 100 in which an embodiment of the present disclosure may be implemented. As shown in FIG. 1, data processing environment 100 includes first electronic device 110 and second electronic device 120. First data processing model 112 is implemented on first electronic device 110, and second data processing model 122 is implemented on second electronic device 120. As used herein, first data processing model 112 and second data processing model 122 may be any model that can process data and output a processing result. In some embodiments, first data processing model 112 and second data processing model 122 may be data processing models based on machine learning. In other embodiments, first data processing model 112 and second data processing model 122 may also be data processing models that are not based on machine learning. In addition, in an embodiment of the present disclosure, first data processing model 112 and second data processing model 122 may be models of the same type, or may be models of different types.

In some embodiments, second electronic device 120 is a device having more powerful functions (e.g., processing capacity) than first electronic device 110. For example, second electronic device 120 may have more computing resources than first electronic device 110. In some embodiments, first electronic device 110 and second electronic device 120 may be relatively distinguished. For example, first electronic device 110 and second electronic device 120 each have certain absolute computing resources, and among the two models, an electronic device having fewer computing resources may be first electronic device 110, while an electronic device having more computing resources may be second electronic device 120. In some other embodiments, first electronic device 110 and second electronic device 120 may be absolutely distinguished. For example, as long as computing resources of an electronic device are fewer than a threshold, the electronic device may be first electronic device 110; while as long as computing resources of an electronic device are more than the threshold, the electronic device may be second electronic device 120. Such a threshold may depend on a specific application scenario and processing task requirements.

Correspondingly, second data processing model 122 implemented on second electronic device 120 may have more powerful functions (e.g., the processing result has a higher accuracy) than first data processing model 112 implemented on first electronic device 110, and thus occupies more computing resources. In some embodiments, first data processing model 112 and second data processing model 122 may be relatively distinguished. For example, no matter how many absolute computing resources are respectively occupied by first data processing model 112 and second data processing model 122, a data processing model occupying fewer computing resources may be first data processing model 112, and a data processing model occupying more computing resources may be second data processing model 122. In some other embodiments, first data processing model 112 and second data processing model 122 may be absolutely distinguished. For example, as long as computing resources occupied by a data processing model are fewer than a threshold, the data processing model may be first data processing model 112, while as long as computing resources occupied by a data processing model are more than the threshold, the data processing model may be second data processing model 122. Such a threshold may depend on a specific application scenario and processing task requirements.

In some embodiments, first data processing model 112 and second data processing model 122 may be obtained by joint training, and therefore, they may be used as a pre-stage and a rear stage to jointly implement data processing. Through joint training, trained first data processing model 112 and trained second data processing model 122 may be guaranteed to implement pre-stage and rear-stage joint processing of data in a manner of being trained, thereby obtaining a processing result required by the task targeted by the training. Of course, in other embodiments, first data processing model 112 and second data processing model 122 may also be separately trained, but they may still be trained as a pre-stage and a rear stage to jointly complete processing of the data. Therefore, although first data processing model 112 and second data processing model 122 may have different target functions during separate training, the two data processing models, as a whole, may have the same overall target function. By separate training, first data processing model 112 and second data processing model 122 may be optimized respectively in a flexible manner.

In an example of FIG. 1, to-be-processed data 105 may be first provided to first data processing model 112 on first electronic device 110. First data processing model 112 can generate initial result 115 with a lower accuracy after processing data 105 because it occupies fewer computing resources and has a lower processing capacity. That is, first data processing model 112 has a certain degree of accuracy (or precision) loss. In addition, it should be pointed out that since initial result 115 further needs to be transmitted to second electronic device 120 for further processing, a data size of initial result 115 may be smaller than a data size of data 105, such that a transmission delay of initial result 115 between first electronic device 110 and second electronic device 120 is at least less than a transmission delay of data 105 between the two electronic devices, thereby reducing the overall processing delay of data 105.

In general, to-be-processed data 105 may be any processable data. In some embodiments, data 105 may include data having a large data size and resulting in a large transmission delay, such as an image, a video, and a voice, or any combination thereof. As discussed above, providing initial result 115 of a smaller data size to second data processing model 122 by first data processing model 112 can advantageously avoid transmitting such data 105 of a larger data size to second data processing model 122 having more powerful functions, thereby shortening an original transmission delay of data 105, and further improving an overall processing speed of data 105. In other embodiments, to-be-processed data 105 may also be data of a small data size, but it may also be processed by first data processing model 112 into initial result 115 of a smaller data size, thereby still shortening the original transmission delay of data 105, and further improving the overall processing speed of data 105.

As shown in FIG. 1, after generating initial result 115 of a small data size than data 105, first electronic device 110 sends initial result 115 to second electronic device 120. After receiving initial result 115, second electronic device 120 adjusts initial result 115 based on second data processing model 122, thereby generating adjusted result 125. Compared with initial result 115, adjusted result 125 generated by second data processing model 122 has a higher accuracy because the second data processing model occupies more computing resources and has a stronger processing capability. In other words, second data processing model 122 may compensate for the accuracy loss of first data processing model 112.

In some embodiments, first data processing model 112 may include a compressed model. Thus, first data processing model 112 may be guaranteed not to be a large-scale model that requires a large amount of computing resources, so as to be advantageously deployed in first electronic device 110 having limited computing resources. An example of model compression will be further described below with reference to FIG. 2. In other embodiments, first data processing model 112 may also not be a compressed model, but may include any other model that is small in scale, occupies a small amount of computing resources, and has limited data processing accuracy. On the other hand, in some embodiments, second data processing model 122 may include a language model. Since the language model may be configured to process word or text information, first electronic device 110 may advantageously send initial result 115 in a word form to second electronic device 120, to minimize a transmission delay of initial result 115 between first electronic device 110 and second electronic device 120.

As a general introduction, the language model may predict a probability of a word sequence by learning. Like a programming language, a formal language may also be fully stipulated. All retained words may be defined, and an effective way of using the retained words may be precisely defined. However, this cannot be done for a natural language. The natural language is not designed but occurs naturally, so there is no formal specification. Some parts and heuristics of the natural language may have formal rules, but unvalidated natural languages are often used. The natural language involves a large number of terms, which may be used by introducing various ambiguities, but can still be understood by others. In addition, the natural language is changing, and the usage of words is also changing. This means that the natural language is a moving target. Linguists try to stipulate the natural language with a formal grammar and structure. This can be done, but it is very difficult and the result may be fragile. An alternative to specifying a language model is to learn the natural language from its examples.

The following example of a language model is considered: Word ordering: p (the cat is small)>p (small the is cat), which shows what the language model can do. In this example, the language model indicates that a probability of the first sentence will be greater than a probability of the second sentence. This ability to model language rules into probabilities embodies semantic understanding of the language model, and provides powerful capabilities for relevant tasks of natural language processing (NLP). This is only one of many applications of the language model. The language model may be used in almost all tasks related to natural language processing, such as voice recognition, machine translation, part-of-speech tagging, analysis, optical character recognition, handwriting recognition, information retrieval, and many other daily tasks.

In some embodiments, first electronic device 110 may include an edge device, and second electronic device 120 may include a cloud device. As used herein, an edge device may refer to, for example, a communication network device, a computer network device, or a network device located at the edge of a cloud in a cloud computing network that is close to a user device or an Internet of Things (IoT) device of a user. Through such an arrangement of the edge device and the cloud device, separate two stage data processing models provided by an embodiment of the present disclosure may be advantageously deployed in a technical scenario of "edge+cloud," thereby improving the data processing performance in the technical scenario of "edge+cloud." Such an embodiment will be further described below with reference to FIG. 3 to FIG. 5. In other embodiments, first electronic device 110 may include any other electronic device having a low device capability (e.g., having limited computing resources), such as various user devices used by a user, various communication networks, a terminal device in a computer network, an IoT device, and a vehicle device. Second electronic device 120 may include any other electronic device having a strong device capability (e.g., having many computing resources), such as a large computer, a server, and a computer cluster.

In some embodiments, first electronic device 110 and second electronic device 120 may include any device capable of implementing computing functions and/or control functions, including but not limited to, a special-purpose computer, a general-purpose computer, a general-purpose processor, a microprocessor, a microcontroller, a state machine, a mobile phone, a cellular phone, a smart phone, a voice over IP (VoIP) phone, a wireless local loop phone, a tablet, a wearable terminal device, a personal digital assistant (PDA), a portable computer, a desktop computer, an image capture terminal device such as a digital camera, a game terminal device, a music storage and playback device, a vehicle wireless terminal device, a wireless endpoint, a mobile station, a smart device, a wireless customer premise equipment (CPE), an IoT device, a vehicle, a UAV, a medical device and application (e.g., a remote surgical device), an industrial device and application (e.g., a robot and/or other wireless devices operating in an industrial and/or automatic processing chain environment), a consumer electronic device, a device operating on a commercial and/or industrial wireless network, and the like. First electronic device 110 and second electronic device 120 may also be implemented as a combination of individual computing devices or computing devices, such as a combination of a digital signal processor (DSP) and a microprocessor, a plurality of microprocessors, a combined DSP core of one or more microprocessors, or any other such configuration. Further, it should be pointed out that in the context of the present disclosure, first electronic device 110 and second electronic device 120 may also be referred to as computing devices. The two terms may be used interchangeably herein.

In some embodiments, a communication link between various devices or components in the system or environment involved in the present disclosure may be any form of connection or coupling capable of implementing data communication or control signal communication between these devices or components, including but not limited to, a coaxial cable, an optical cable, a twisted pair, or a wireless technology (e.g., infrared, radio, and microwave). In some embodiments, the communication link may also include, but is not limited to, a device for network connection, such as a network card, a hub, a modem, a repeater, a network bridge, a switch, and a router, as well as various network connection lines, wireless links, and the like. In some embodiments, the communication link may include various types of buses. In other embodiments, the communication link may include a computer network, a communication network, or other wired or wireless networks.

It should be understood that FIG. 1 only schematically shows units, elements, modules, or components related to embodiments of the present disclosure in data processing environment 100. In practice, data processing environment 100 may further include other units, elements, modules, or components for other functions. In addition, the specific number of devices, units, elements, modules, or components shown in FIG. 1 is merely schematic, and is not intended to impose any limitation to the scope of the present disclosure in any way. In other embodiments, data processing environment 100 may include any suitable number of electronic devices and related elements. Therefore, the embodiments of the present disclosure are not limited to the specific scenario depicted in FIG. 1, but generally apply to any technical environment of separate data processing models.

Figure 2:
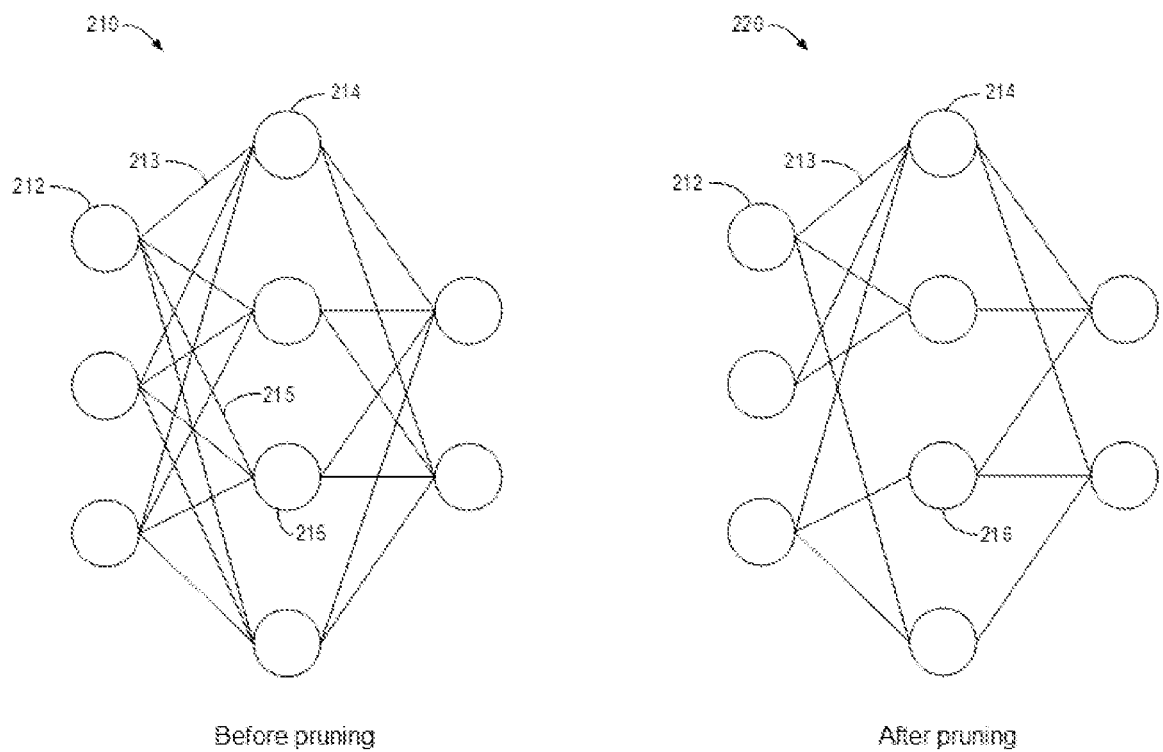
FIG. 2 shows a schematic diagram of model compression by pruning according to an embodiment of the present disclosure.

FIG. 2 shows a schematic diagram of model compression by pruning according to an embodiment of the present disclosure. In an example of FIG. 2, model 210 may be an example model prior to pruning. For example, model 210 may include nine nodes, such as nodes (also referred to as processing units, neurons, or the like) 212, 214, and 216. These nodes form three layers. There are connections between nodes in each layer and nodes in adjacent layers, and each connection may represent an operation within model 210. For example, these connections include connection 213 between nodes 212 and 214 and connection 215 between nodes 212 and 216.

As shown in FIG. 2, model 210 after pruning may become compressed model 220. Some connections among the connections between the nodes in the layers of model 210 are considered to be unimportant and are "pruned," that is, they are neglected or deleted from model 210. For example, in this example of FIG. 2, connection 215 is considered to be less important than connection 213. Therefore, connection 215 is neglected or deleted in compressed model 220, while connection 213 is retained in model 220. By pruning some connections, a computing workload in model 210 may be reduced, and model parameters may also be reduced. While FIG. 2 shows an example of model compression by pruning, model compression of the present disclosure is not limited to this. Any other model compression method, such as quantization, low-rank decomposition, and knowledge distillation, equally applies.

In general, model compression is to prune or change a model to a smaller model while maintaining a model accuracy. In some cases, making a data processing model (e.g., a classifier or a regressor) have a high accuracy is not enough. The data processing model still must meet strict time requirements and space requirements. However, in many cases, a model with the best performance is too slow and too big to meet these requirements, while fast and compact models are less accurate because they have insufficient expressions, or they are overfitted to limited training data. In such a case, model compression may help to achieve a fast, compact, but highly accurate model. In general, the main idea behind model compression is to approximate, using a fast and compact model, functions learned by a slower and bigger model with better performance.

As indicated above, a specific reason for more researchers to turn to model compression is that it is difficult to deploy a model having powerful functions on a system having limited hardware resources. While these models have successfully attracted attention and achieved outstanding performance, models having powerful functions can only operate under the support of expensive high-speed computing resources (e.g., CPU and GPU), thereby limiting the applications of these powerful models. However, while an object of model compression is to compress a model without sacrificing the accuracy, it is difficult to achieve this object. For example, in some compression scenarios, a compressed model perhaps saves a lot of space, but the model accuracy may only be half of the original accuracy. Such accuracy may be too low to make a system to which the model is applied properly operate.

Figure 3:
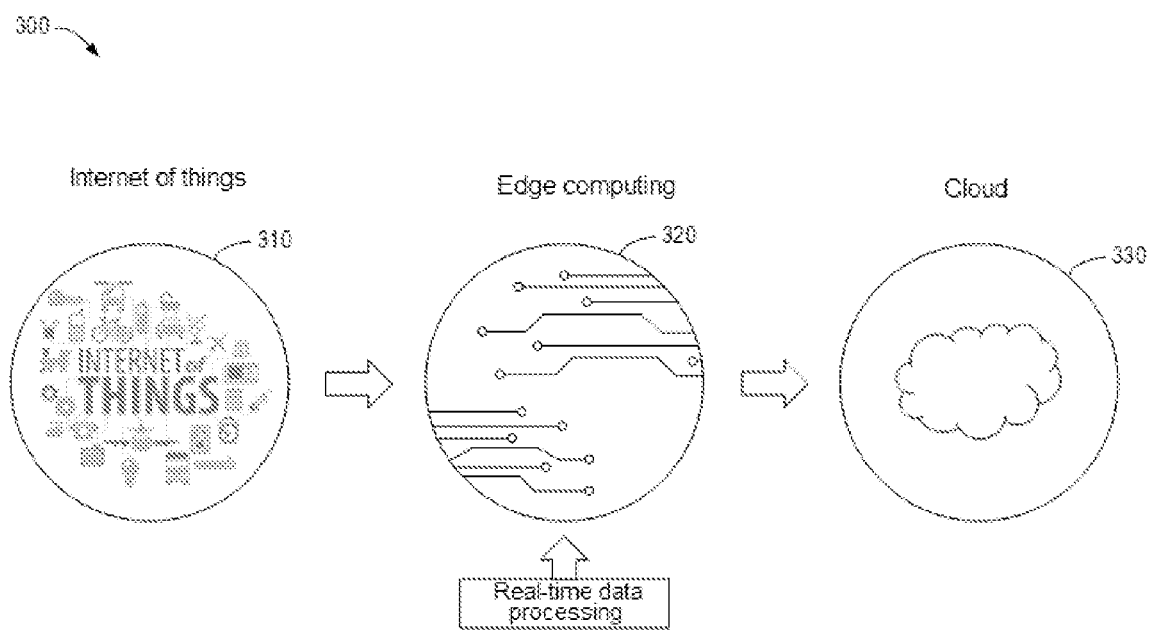
FIG. 3 shows a schematic diagram of an example scenario of edge computing and cloud computing according to an embodiment of the present disclosure.

FIG. 3 shows a schematic diagram of example scenario 300 of edge computing and cloud computing according to an embodiment of the present disclosure. As shown in FIG. 3, example scenario 300 includes Internet of Things (IoT) 310, edge computing portion 320, and cloud portion 330. In some embodiments, to-be-processed data generated by a device in IoT 310 may be provided to an edge device in edge computing portion 320 for real-time data processing. A processing result of edge computing portion 320 on the data may also be returned to a device of IoT 310 in real time, such that the device in IoT 310 executes relevant operations or subsequent processing.

In some cases, edge computing offloading may be executed in example scenario 300. As mentioned, in the IoT setting of example scenario 300, many computations need to be executed in edge devices of edge computing portion 320, but the edge devices have limited computing resources, which may result in a huge processing delay. Therefore, some operations in edge computing portion 320 may be offloaded to cloud 330. By offloading these computations or even models to cloud 330, inference time of a data processing model will be much shorter than that when these operations or models run on the edge devices. However, as indicated above, a time delay caused by data transfer between cloud 330 and edge 320 should also be considered. That is, the to-be-processed data needs to be transmitted from edge computing portion 320 to cloud 330, and a computing result in cloud 330 may need to be transmitted back to edge computing portion 320. Therefore, how to balance the time delay caused by data transfer and model inference may be important.

Figure 4:
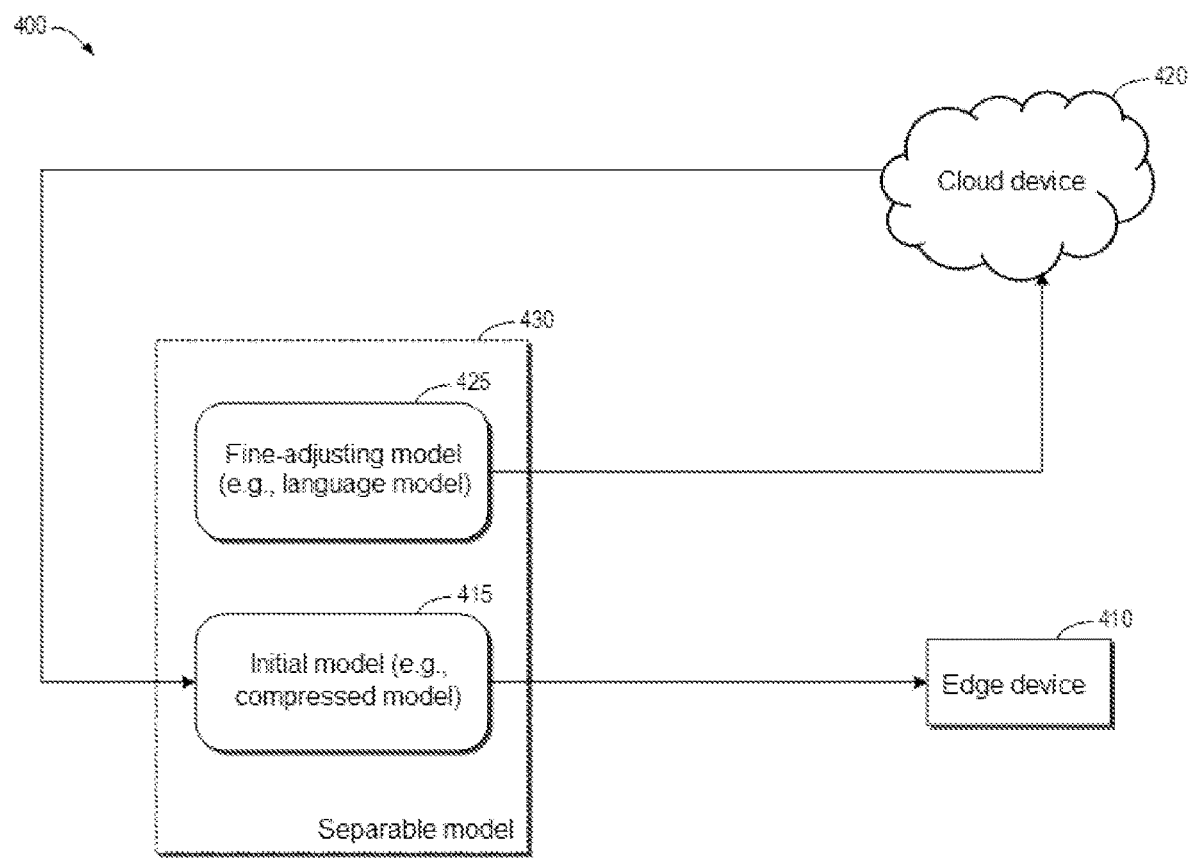
FIG. 4 shows an example deployment of a separable model including an initial model and a fine-adjusting model in an "edge+cloud" scenario according to an embodiment of the present disclosure.

FIG. 4 shows example deployment 400 of separable model 430 including initial model 415 and fine-adjusting model 425 in an "edge+cloud" scenario according to an embodiment of the present disclosure. As mentioned above, the "edge+cloud" scenario has some technological characteristics. For example, an edge device has a low device capability and usually has a small amount of computing resources, while a cloud device has a strong device capability and usually has more computing resources, and a data transmission delay between the edge device and the cloud device is not negligible.

As shown in FIG. 4, for the above characteristics of the "edge+cloud" scenario, the embodiment of the present disclosure may provide separable model 430 including initial model 415 and fine-adjusting model 425. It should be noted that initial model 415 may be an example of first data processing model 112 depicted in FIG. 1, such that the initial model may occupy a small amount of computing resources, and the processing result may have a low accuracy. Fine-adjusting model 425 may be an example of second data processing model 122 depicted in FIG. 1, such that the fine-adjusting model may occupy more computing resources, and the processing result may have a higher accuracy. As shown in the arrow direction in FIG. 4, based on the characteristics of the "edge+cloud" scenario and separable model 430, initial model 415 in separable model 430 may be deployed in edge device 410, and fine-adjusting model 425 in separable model 430 may be deployed in cloud device 420.

As mentioned above, in some embodiments, fine-adjusting model 425 may be a language model, thereby advantageously implementing word information transmission between initial model 415 and fine-adjusting model 425, and minimizing a transmission delay of such word information between edge device 410 and cloud device 420. Therefore, in such an embodiment of the present disclosure, a separable compression algorithm based on a language model is implemented. This algorithm may finely adjust a model compression result using the language model (in cloud) to compensate for the accuracy loss caused by compression, and at the same time, it can make results of relevant tasks of data processing (e.g., a relevant task of natural language processing) better. Compared with other compression and fine-adjusting algorithms, this algorithm is faster and more space efficient (for edge devices).

Figure 5:
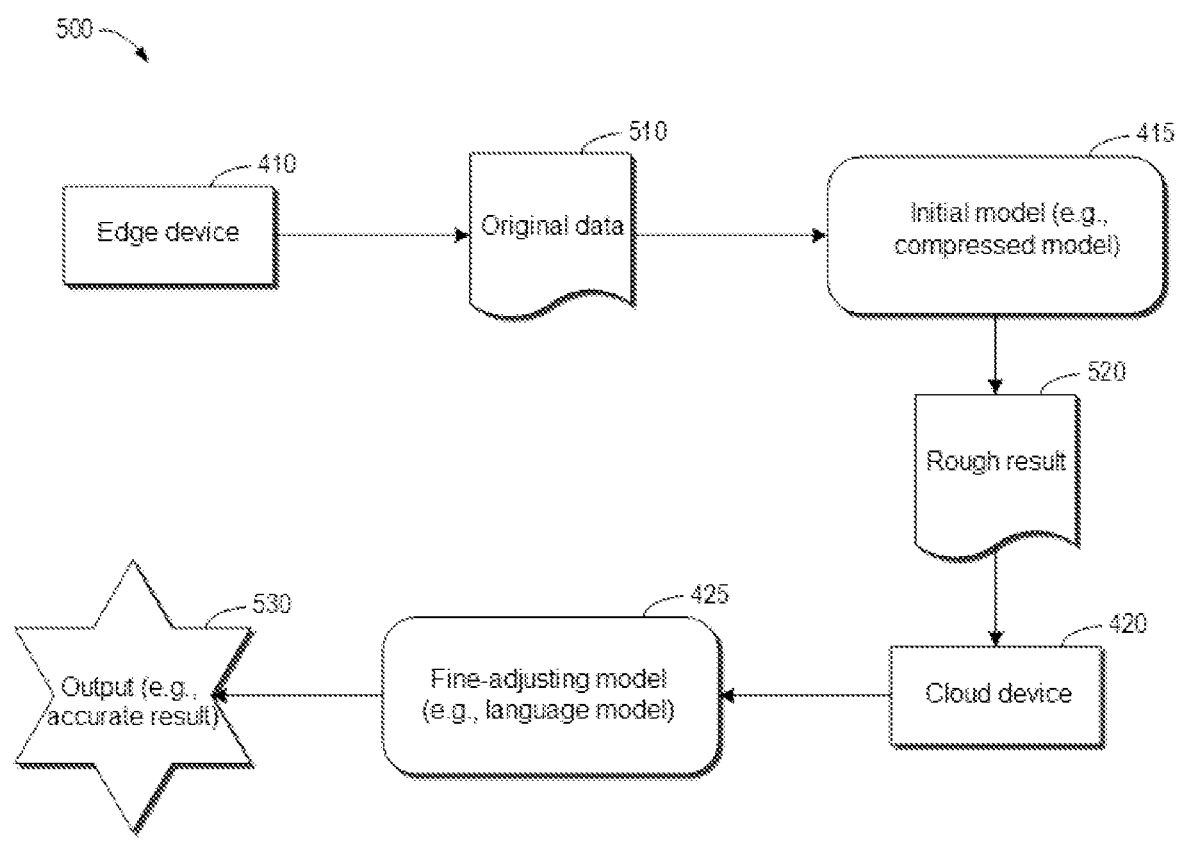
FIG. 5 shows a schematic diagram of a data processing flow of a separable model deployed in an "edge+cloud" scenario according to an embodiment of the present disclosure.

FIG. 5 shows a schematic diagram of data processing flow 500 of separable model 430 deployed in an "edge+cloud" scenario according to an embodiment of the present disclosure. It should be noted that while FIG. 5 depicts initial model 415 outside edge device 410, and depicts fine-adjusting model 425 outside cloud device 420, this is merely illustrative to better explain data flow between various units or modules. In a specific implementation, initial model 415 may be implemented in edge device 410, and fine-adjusting model 425 may be implemented in cloud device 420.

As shown in FIG. 5, in data processing flow 500, edge device 410 may provide original data 510 to initial model 415. Initial model 415 may process original data 510 to generate rough result 520. It should be noted that rough result 520 may be an example of initial result 115 depicted in FIG. 1. Then, rough result 520 having a smaller data size than original data 510 may be provided to cloud device 420. Cloud device 420 may adjust or process rough result 520 based on fine-adjusting model 425 to generate output 530, e.g., an accurate result.

As can be seen from FIG. 4 and FIG. 5, in respect of model splitting and distribution design, embodiments of the present disclosure may, e.g., consider a complex data processing task composed of several (e.g., 2 or 3) simple sub-tasks. Some use examples will be described below with reference to FIG. 9 and FIG. 10. It should be pointed out that most of the current work uses end-to-end solutions in these data processing tasks, but these end-to-end solutions are not flexible enough. In addition, while very few solutions may consider separately training models, separate training will make it more difficult to converge a model to a good second-best point, and will cause many other problems.

As shown in FIG. 4 and FIG. 5, the embodiments of the present disclosure enable a model to be separable, so as to adjust the model accuracy in a flexible manner to meet requirements of data processing tasks. Specifically, in some embodiments, the model may be divided into two portions. The first portion may be referred to as a sensing portion, and a model in the sensing portion may complete its data processing task only at a low accuracy. An input of the sensing portion may be directly from the edge device and has a large size (e.g., an image, a video, and a voice). The sensing portion may only need to give a rough processing result. The second portion may be referred to as a fine-adjusting portion. The model in the fine-adjusting portion may need to be precise to finely adjust an output of the sensing portion and give an adjusted result. Inputs of the fine-adjusting portion are usually obtained from the sensing portion, and these inputs usually may be of very small sizes. The fine-adjusting portion needs to give a precise result as a final output.

In the example of FIG. 5, initial model 415 belongs to the sensing portion, while fine-adjusting model 425 belongs to the fine-adjusting portion. It is assumed that in the example, a data processing task of initial model 415 may be recognizing words from an image. Initial model 415 may acquire an image directly from edge device 410 and give rough result 520 of the words. Fine-adjusting model 425 may obtain rough result 520 from initial model 415 and finely adjust rough result 520. Then, fine-adjusting model 425 may output an accurate and better result. In addition, it should be noted that in the above example, rough result 520 is words, a data size of which is much smaller than that of the image. Therefore, it takes less time to transmit words than to transmit images between edge device 410 and cloud device 420. In addition, fine-adjusting model 425 needs to be accurate, and therefore, it needs to occupy more computing resources and a larger space. Therefore, fine-adjusting model 425 is deployed on cloud device 420, initial model 415 is deployed on edge device 410, data transfer time between the two models is minimized, and the accuracy and model size of each model also meet the requirements. In general, initial model 415 having a low accuracy and a large input is arranged on edge device 410, and fine-adjusting model 425 having a high accuracy and a small input is arranged on cloud device 420.

Figure 6A:
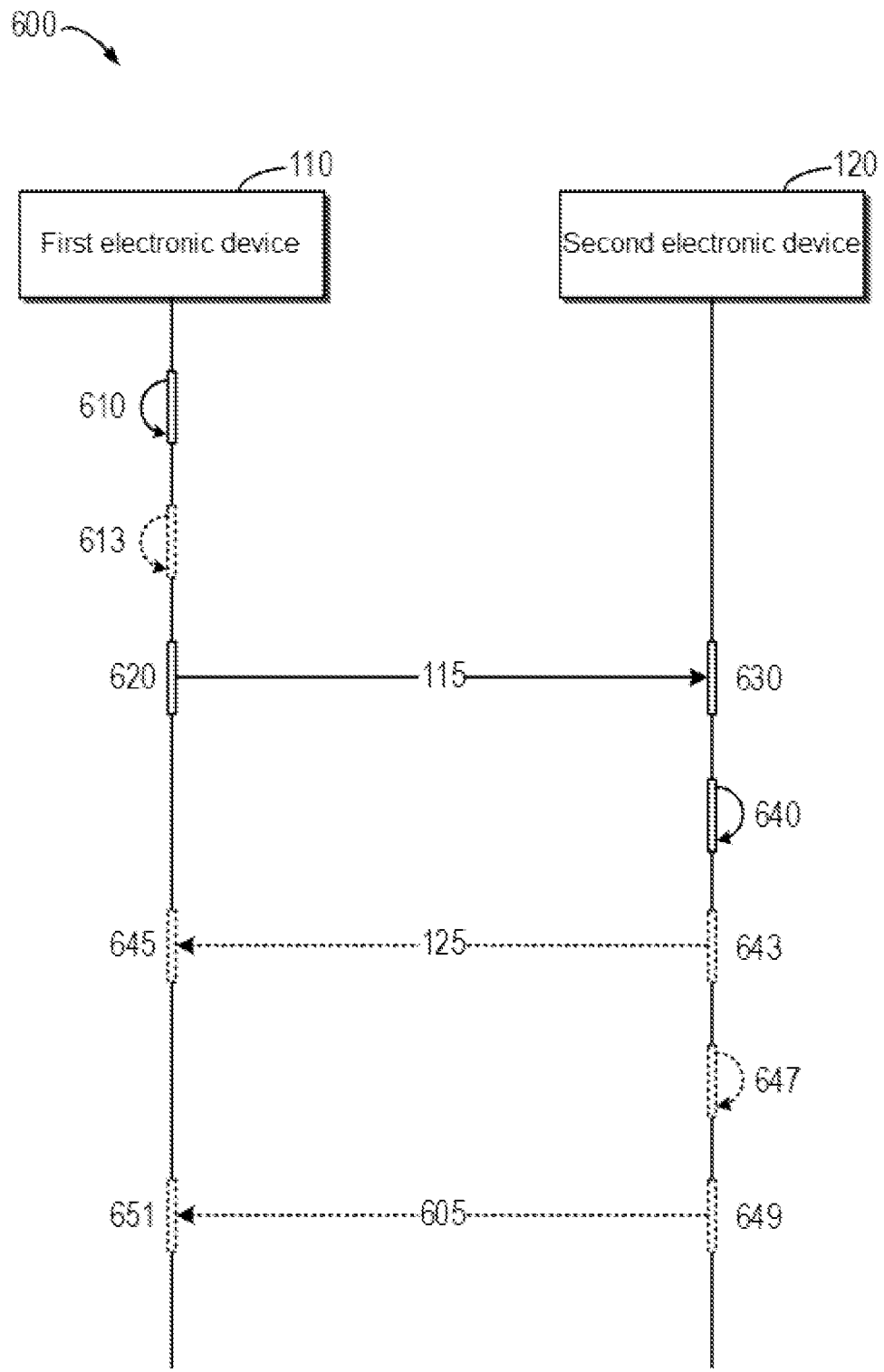
FIG. 6A shows a schematic diagram of an interaction process between a first electronic device and a second electronic device according to an embodiment of the present disclosure.

FIG. 6A shows a schematic diagram of interaction process 600 between first electronic device 110 and second electronic device 120 according to an embodiment of the present disclosure. For the purpose of discussion, interaction process 600 will be described with reference to FIG. 1. However, it will be appreciated that interaction process 600 may be equally applicable to any other similar scenario where two electronic devices complete a common data processing task through separate data processing models. It should be noted that in FIG. 6A, optional actions or operations are represented by dotted lines.

As shown in FIG. 6A, first electronic device 110 processes (610) data 105 based on first data processing model 112 to generate initial result 115. As mentioned above, a data size of initial result 115 is smaller than a data size of data 105. For example, data 105 may be data of a large data size, such as a video, an image, or audio, while initial result 115 may be data of a small data size, such as word or word content. For another example, data 105 may be data of a large data size, such as a video, an image, or audio, while initial result 115 may be data of a small data size, such as a compressed video, a compressed image, or a compressed audio. More generally, data 105 may be any type of data, and initial result 115 may also have any type of form, as long as the data size of initial result 115 is smaller than the data size of data 105. Thus, initial result 115 with a smaller data size instead of data 105 with a larger data size can be transmitted between first electronic device 110 and second electronic device 120, such that a data transmission delay between first electronic device 110 and second electronic device 120 may be shortened.

After generating initial result 115, first electronic device 110 sends (620) initial result 115 to second electronic device 120. Accordingly, second electronic device 120 receives (630) initial result 115 from first electronic device 110. After receiving (630) initial result 115, second electronic device 120 adjusts (640) initial result 115 based on second data processing model 122 to generate adjusted result 125. As mentioned above, second data processing model 122 occupies more computing resources than first data processing model 112, and therefore, it is a model having a stronger processing capacity than first data processing model 112. Therefore, adjusted result 125 has a higher accuracy than initial result 115.

For example, it is assumed that data 105 is image data, and a data processing task of first data processing model 112 and second data processing model 122 is to recognize an object in image data 105. In this case, initial result 115 generated by first data processing model 112 may be a rough recognition result of image data 105, where there may be an inaccurately recognized object or an unrecognized object. Adjusted result 125 generated by second data processing model 122 is a recognition result having a higher accuracy, which may correct the inaccurately recognized object or recognize the unrecognized object in initial result 115.

For another example, it is assumed that data 105 is audio data, and a data processing task of first data processing model 112 and second data processing model 122 is to convert audio data 105 into word content. In this case, initial result 115 generated by first data processing model 112 may be a rough conversion result of audio data 105, where there may be inaccurately converted content or unconverted content. Adjusted result 125 generated by second data processing model 122 is a conversion result having a higher accuracy, which may correct the inaccurately converted content or convert the unconverted content in initial result 115.

More generally, as content recorded in data 105 varies, and data processing tasks of first data processing model 112 and second data processing model 122 vary, content of initial result 115 and content of adjusted result 125 may be different, and a specific approach of measuring the result accuracy may also be different. However, in general, first electronic device 110 may preliminarily analyze and process data 105 based on first data processing model 112, thereby obtaining initial result 115 having a low accuracy. Second electronic device 120 may further adjust or process initial result 115 based on second data processing model 122, thereby obtaining adjusted result 125 having a higher accuracy.

Through example process 600, separate first data processing model 112 and second data processing model 122 avoid balancing between a model size of a single model and an accuracy of a processing result, and minimize a data transmission delay between first data processing model 112 and second data processing model 122, thereby optimizing the data processing performance of first data processing model 112 and second data processing model 122 as a whole.

In some embodiments, first electronic device 110 may not always send initial result 115 to second electronic device 120. Alternatively, before transmitting initial result 115 to second electronic device 120, first electronic device 110 may first determine whether the accuracy of initial result 115 has met the requirements of the data processing task, to determine whether it is necessary to send initial result 115 to second electronic device 120. Thus, first electronic device 110 may only send initial result 115 to second electronic device 120 when necessary, thereby reducing consumption of processing resources of second electronic device 120 and transmission resources between first electronic device 110 and second electronic device 120.

More specifically, if first electronic device 110 determines (613) that a confidence degree of initial result 115 is less than a threshold, first electronic device 110 may send (620) initial result 115 to second electronic device 120, such that second electronic device 120 obtains adjusted result 125 with a higher accuracy. If the confidence degree of initial result 115 is not high enough, it may be considered necessary to finely adjust initial result 115. In order to compute the confidence degree of initial result 115, some measurements, such as cross entropy, may be used. In some embodiments, the confidence threshold above may depend on a specific data processing task. For example, if an application scenario is to recognize a license plate of a vehicle to determine whether the driving operation of the vehicle is compliant, the requirements of the data processing task may be met without very high recognition accuracy. Therefore, the confidence threshold may be low. On the other hand, if first electronic device 110 determines (613) that the confidence degree of initial result 115 is higher than a threshold, first electronic device 110 may not need to send (620) initial result 115 to second electronic device 120, thereby saving processing resources of second electronic device 120 and transmission resources between first electronic device 110 and second electronic device 120.

In some embodiments, in order to minimize a transmission delay of initial result 115 from first electronic device 110 to second electronic device 120, first electronic device 110 may generate initial result 115 in a word or text form, to minimize the data size of initial result 115. Specifically, when processing (610) data 105 based on first data processing model 112, first electronic device 110 may process data 105 to generate initial result 115 in a word or text form. In other words, initial result 115 may be in the word or text form. Accordingly, second electronic device 120 may receive and process initial result 115 in the word or text form. Thus, the transmission delay of initial result 115 between first electronic device 110 and second electronic device 120 may be minimized.

In some embodiments, second electronic device 120 may send (643) adjusted result 125 to first electronic device 110. Accordingly, first electronic device 110 may receive (645) adjusted result 125 from second electronic device 120. Thus, if first electronic device 110 is a user device, a user may obtain adjusted result 125 through first electronic device 110, thereby implementing or completing a function, operation, or processing that the user desires to realize. If first electronic device 110 is an edge device, first electronic device 110 may implement an instruction or control of the user device based on adjusted result 125, or may further provide adjusted result 125 to the user device, thereby implementing or completing the function, operation, or processing that the user desires to realize. Of course, in other embodiments, second electronic device 120 may directly send adjusted result 125 to the user device, thereby implementing or completing the function, operation, or processing that the user desires to realize. In such embodiments, second electronic device 120 may not need to send (643) adjusted result 125 to first electronic device 110.

In some embodiments, second electronic device 120 may further process (647) adjusted result 125 based on second data processing model 122 to generate final result 605. In other words, final result 605 may be further generated by second electronic device 120 based on adjusted result 125. In some embodiments, final result 605 may be modification suggestions or other useful information obtained after analyzing content in data 105 by second data processing model 122 having powerful functions. For example, final result 605 may correct an error existing in the content of data 105, or find other information useful for the user that can be inferred from the content of data 105. In other embodiments, final result 605 may also be a re-optimized processing result obtained by further improvement or mining of adjusted result 125 by any other approach.

However, second electronic device 120 may send (649) final result 605 to first electronic device 110. Accordingly, first electronic device 110 may receive (651) final result 605 from second electronic device 120. Thus, first data processing model 112 and second data processing model 122 not only may provide the user with a processing result within the requirements of the data processing task about data 105, but also may provide the user with more processing results and functions besides the requirements of the data processing task, thereby further optimizing the data processing performance of first data processing model 112 and second data processing model 122 as a whole.

Figure 6B:
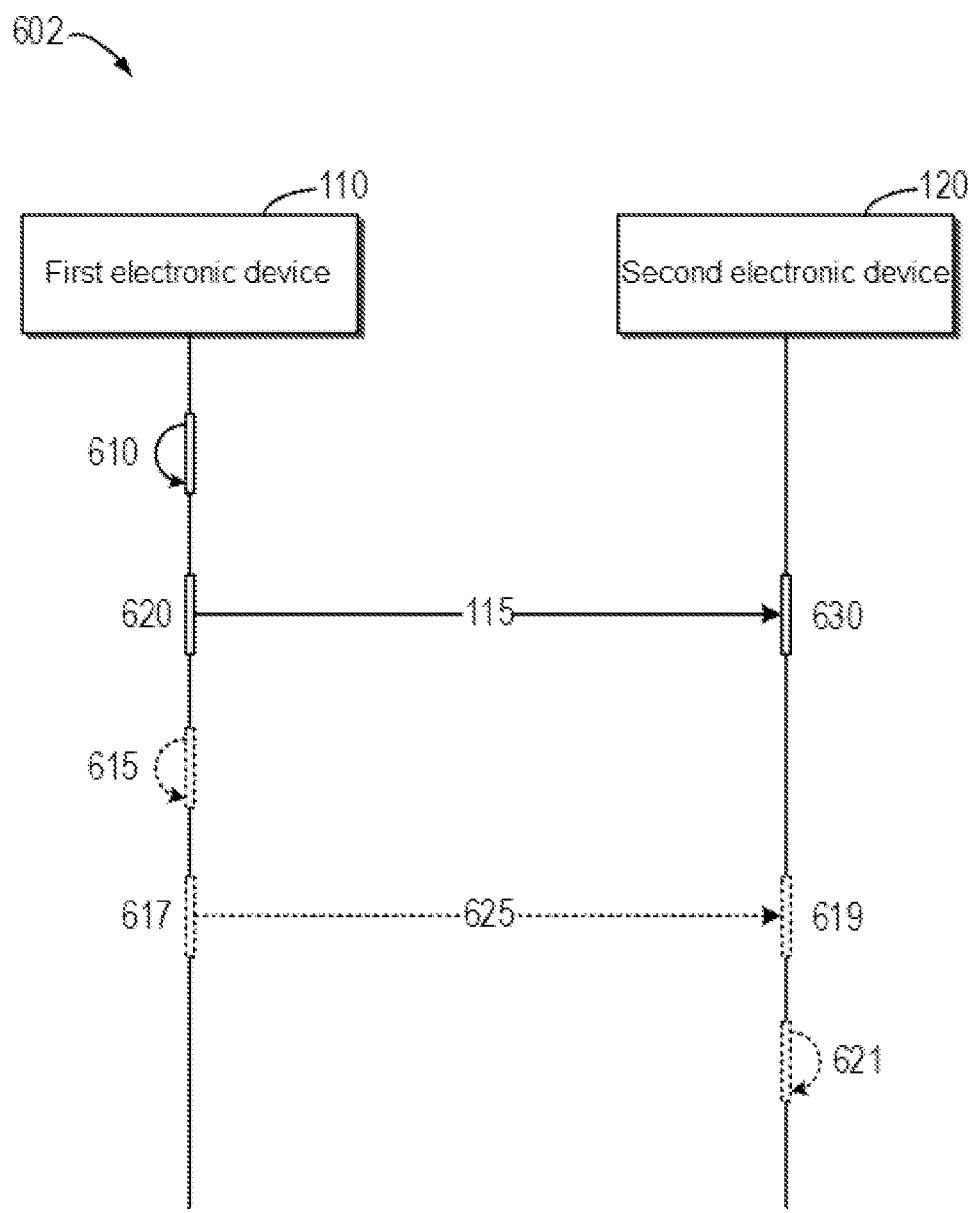
FIG. 6B shows a schematic diagram of another interaction process between the first electronic device and the second electronic device according to an embodiment of the present disclosure.

FIG. 6B shows a schematic diagram of another interaction process 602 between first electronic device 110 and second electronic device 120 according to an embodiment of the present disclosure. For the purpose of discussion, interaction process 602 will be described with reference to FIG. 1. However, it will be appreciated that interaction process 602 may be equally applicable to any other similar scenario where two electronic devices complete a common data processing task through separate data processing models. It should be noted that interaction process 602 depicted in FIG. 6B may be considered as another example implementation of interaction process 600 depicted in FIG. 6A.

As shown in FIG. 6B, in example process 602, similar to example process 600, first electronic device 110 processes (610) data 105 based on first data processing model 112 to generate initial result 115, a data size of initial result 115 being smaller than a data size of data 105. For example, data 105 may be data of a large data size, such as a video, an image, and audio, while initial result 115 may be data of a small data size, such as word or text content. Then, first electronic device 110 sends (620) initial result 115 to second electronic device 120. Accordingly, second electronic device 120 receives (630) initial result 115 from first electronic device 110.

Unlike example process 600, in addition to providing initial result 115 to second electronic device 120, first electronic device 110 may also generate (615) word information 625 describing the content of data 105. As used herein, word information 625 is used for describing the content recorded in data 105, and may be used by second electronic device 120 for better adjusting initial result 115 to generate adjusted result 125. For example, it is assumed that data 105 is image data and the recorded content is a picture where a dog is running on a lawn. In such a case, word information 625 may be, for example, word information for describing the content that "a dog is running on a lawn." More generally, as the content recorded in data 105 varies, first electronic device 110 may analyze and process data 105, thereby obtaining word information 625 for describing the content of data 105. In some embodiments, first electronic device 110 may obtain word information 625 based on first data processing model 112. In other embodiments, first electronic device 110 may also obtain word information 625 by other approaches irrelevant to first data processing model 112.

After generating (615) word information 625, first electronic device 110 may send (617) word information 625 to second electronic device 120. Referring to both FIG. 6A and FIG. 6B, in the case where first electronic device 110 provides second electronic device 120 with both initial result 115 and word information 625, when second electronic device 120 is to adjust (640) initial result 115 based on second data processing model 122, second electronic device 120 may first receive (619) word information 625 for describing the content of data 105 from first electronic device 110, and then generate (621) adjusted result 125 based on word information 625 and initial result 115. By example process 602, first electronic device 110 may provide second electronic device 120 with more information (e.g., word information 625) related to data 105, for assisting second electronic device 120 to generate adjusted result 125, such that an accuracy of adjusted result 125 may be further improved. Therefore, the data processing performance of first data processing model 112 and second data processing model 122 as a whole may be further optimized.

Figure 7:
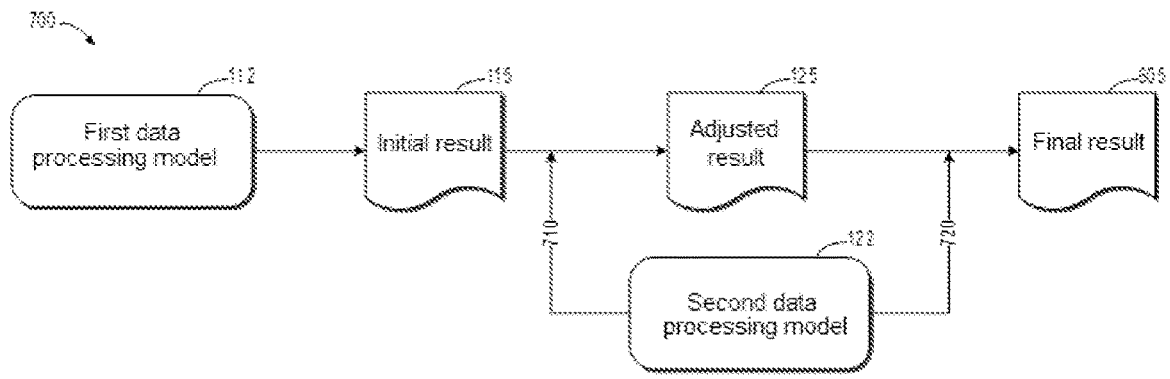
FIG. 7 shows a schematic diagram of a processing flow of the second electronic device based on a second data processing model using a two-stage fine-adjusting algorithm according to an embodiment of the present disclosure.

FIG. 7 shows a schematic diagram of processing flow 700 of second electronic device 120 based on second data processing model 122 using a two-stage fine-adjusting algorithm according to an embodiment of the present disclosure. It should be noted that FIG. 7 further shows a two-stage fine-adjusting process of generating adjusted result 125 and final result 605 by second data processing model 122 described above with reference to FIG. 6A. As shown in FIG. 7, first data processing model 112 may provide initial result 115, and second data processing model 122 may execute the two-stage fine-adjusting process on initial result 115, thereby generating adjusted result 125 and final result 605 respectively. Specifically, in first-stage fine-adjusting process 710, second data processing model 122 may generate adjusted result 125 based on initial result 115. Further, in second-stage fine-adjusting process 720, second data processing model 122 may generate final result 605 based on adjusted result 125. In some embodiments, adjusted result 125 and final result 605 may be used to meet different requirements of data processing tasks.

As indicated above, a conventional model compression algorithm focuses more on how to prune meaningless model portions to reduce the model size, but the situation in the real world is not desirable. For some reason, some useful model portions may also be pruned in the compression process. Therefore, the compression loss of a compressed model is inevitable, especially in the context of edge computing. Therefore, in some embodiments of the present disclosure, how to better finely adjust the initial result after model compression may be considered. By natural language processing and the approach depicted in FIG. 7, embodiments of the present disclosure may realize a two-stage fine-adjusting algorithm based on a language model. Specifically, in the first-stage fine-adjusting, a task of the language model as second data processing model 122 may be compensating for the accuracy loss of first data processing model 112 (e.g., caused by compression). For the word recognition example described above, a task of the language model may be making a word closer to an original word in an image. Then, in the second-stage fine adjusting, the language model may perform more advanced fine adjustment. For example, the language model may give some suggestions on a recognized word, such that the recognized word is more meaningful or is more specific to some other objects. In this stage, the language model may not directly change the content of "adjusted result 125," and the second-stage fine adjustment may be in a variety of forms, such as giving a suggestion to a user.

Figure 8:
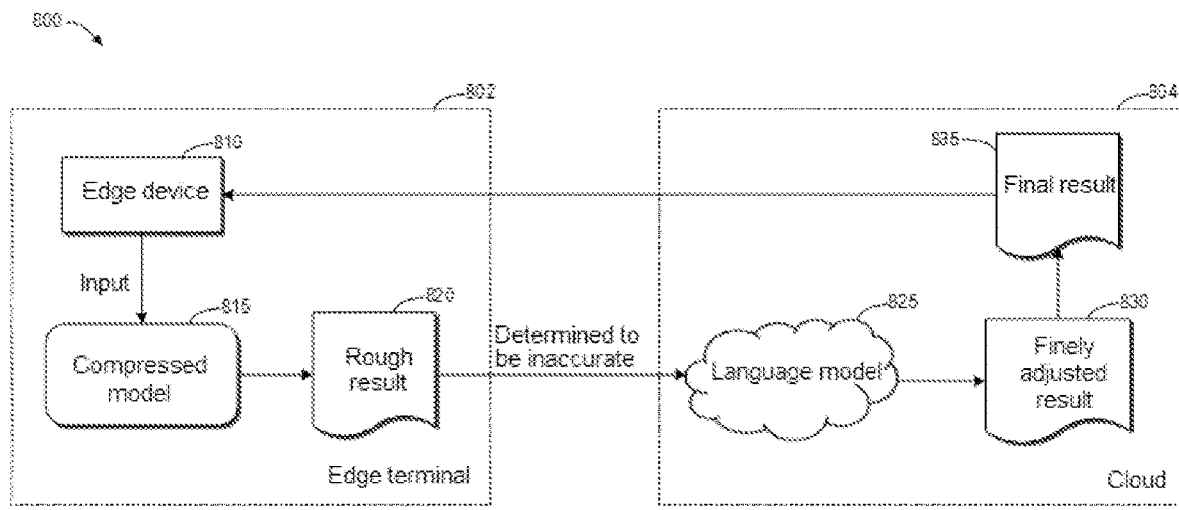
FIG. 8 shows a schematic diagram of an overall structure of a two-stage fine-adjusting algorithm implemented in an "edge+cloud" scenario according to an embodiment of the present disclosure.

FIG. 8 shows a schematic diagram of overall structure 800 of a two-stage fine-adjusting algorithm implemented in an "edge+cloud" scenario according to an embodiment of the present disclosure. As shown in FIG. 8, edge device 810 at edge terminal 802 may input to-be-processed data to compressed model 815. It should be noted that compressed model 815 may be an example of first data processing model 112 in FIG. 1. For example, compressed model 815 has a small model size because it is compressed, so it may be deployed at edge device 810 having a small amount of computing resources or other resources, and occupies a small amount of computing resources or other resources, thereby only providing a processing result with a low accuracy. Therefore, compressed model 815 may process data inputted from edge device 810 to obtain rough result 820, which may be an example of initial result 115 described above. It should be further noted that although FIG. 8 depicts compressed model 815 outside edge device 810, this is merely illustrative to better explain data flow between various units or modules. In a specific implementation, compressed model 815 may be implemented in edge device 810.

In some embodiments, edge device 810 may determine that rough result 820 is not accurate enough. For example, a confidence degree of rough result 820 may be lower than a threshold. For another example, rough result 820 may fail to achieve a target function of a user or data processing. In such an embodiment, edge device 810 may send rough result 820 in a word form (or a text form) to language model 825 implemented in cloud 804. It should be noted that language model 825 may be an example of second data processing model 122 in FIG. 1. For example, because language model 825 may be an uncompressed advanced machine learning model, it has a larger model size, so it may be deployed in cloud 804 having more computing resources or other resources, and occupies more computing resources or other resources, thereby providing a processing result with a higher accuracy.

As shown in FIG. 8, as first-stage fine adjustment, language model 825 may adjust rough result 820 to obtain finely adjusted result 830, which may be an example of adjusted result 125 described above. For example, finely adjusted result 830 may have a higher accuracy than rough result 820. In some embodiments, although not shown in FIG. 8, finely adjusted result 830 may be transmitted from cloud 804 to edge terminal 802 and further provided to the user. For example, finely adjusted result 830 may be transmitted in a word or text form to reduce a transmission delay. Further, as second-stage fine adjustment, language model 825 may further execute further processing on finely adjusted result 830, thereby obtaining final result 835. It should be noted that final result 835 may be an example of final result 605 described above with respect to FIG. 6A and FIG. 7. For example, final result 835 may have a higher accuracy than finely adjusted result 830. For another example, compared with finely adjusted result 830, final result 835 may provide additional information or more abundant functions, or may be more meaningful for a user. Then, final result 835 may be transmitted from cloud 804 to edge terminal 802 and further provided to the user. For example, final result 835 may be transmitted in a word or text form to reduce a transmission delay.

Figure 9:
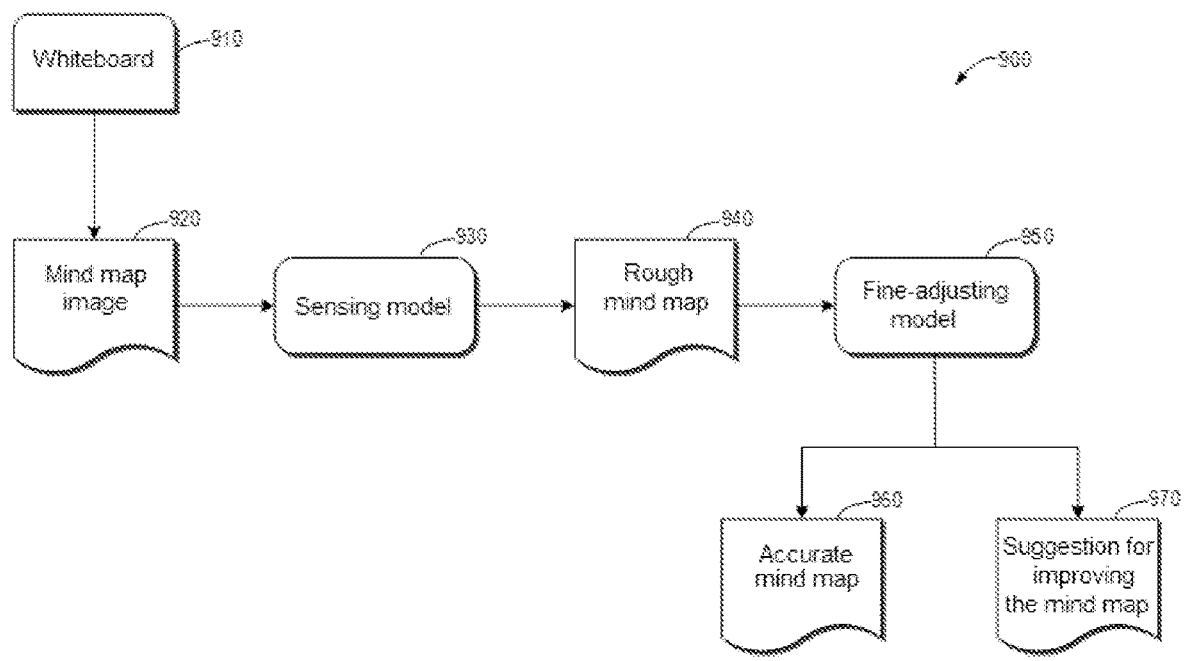
FIG. 9 shows a schematic diagram of a use example applied to a mind map recognition scenario according to an embodiment of the present disclosure.

FIG. 9 shows a schematic diagram of use example 900 applied to a mind map recognition scenario according to an embodiment of the present disclosure. As shown in FIG. 9, in use example 900 of mind map recognition, it is assumed that a mind map is manually drawn on whiteboard 910 and needs to be converted into an electronic version. For example, by an image collecting device (e.g., a camera, a mobile phone, or a tablet device) and based on whiteboard 910 with the mind map depicted, mind map image 920 may be generated and provided to sensing model 930. It should be noted that sensing model 930 may be an example of first data processing model 112 in FIG. 1. For example, sensing model 930 may be deployed in first electronic device 110 having a small amount of computing resources (e.g., an edge device), occupies a small amount of computing resources, and thus can only provide a recognition result with a low accuracy. Therefore, sensing model 930 may process mind map image 920, thereby obtaining rough mind map 940. For example, since sensing model 930 is a model occupying a small amount of computing resources and having limited recognition capability, there may be an inaccurately recognized word (or node), an unrecognized word, or the like in rough mind map 940 provided by sensing model 930.

In order to obtain a more accurate recognition result, rough mind map 940 may be further provided to fine-adjusting model 950 (e.g., a language model). It should be noted that fine-adjusting model 950 may be an example of second data processing model 122 in FIG. 1. For example, fine-adjusting model 950 may be deployed in second electronic device 120 (e.g., a cloud device) having more computing resources, occupies more computing resources, and thus can provide a recognition result with a higher accuracy. Therefore, as first-stage fine adjustment, fine-adjusting model 950 may adjust rough mind map 940 to compensate for the accuracy loss of sensing model 930 (e.g., caused by model compression), thereby generating accurate mind map 960, which may be an example of adjusted result 125 described above. For example, since fine-adjusting model 950 is a model occupying more computing resources and having more powerful functions, fine-adjusting model 950 may, in accurate mind map 960, correct the inaccurately recognized word in rough mind map 940, supplement the unrecognized word, and so on.

Further, as second-stage fine adjustment, fine-adjusting model 950 may further provide suggestion 970 for improving the mind map on the basis of accurate mind map 960. It should be noted that suggestion 970 for improving the mind map may be an example of final result 605 described above with respect to FIG. 6A and FIG. 7. For example, suggestion 970 for the mind map may discover an unreasonable association connection between nodes in accurate mind map 960, newly discover a possibly existing association connection between two nodes and a possibly existing logic problem in the mind map, optimize a structure of the mind map, point out unnecessary nodes in the mind map, and so on. In other words, the addition of the language model may also provide a better result by understanding content of the mind map, i.e., by making a system more intelligent to compensate for the accuracy loss. The better result may be given in the form of suggestions in the example of FIG. 9.

Figure 10:
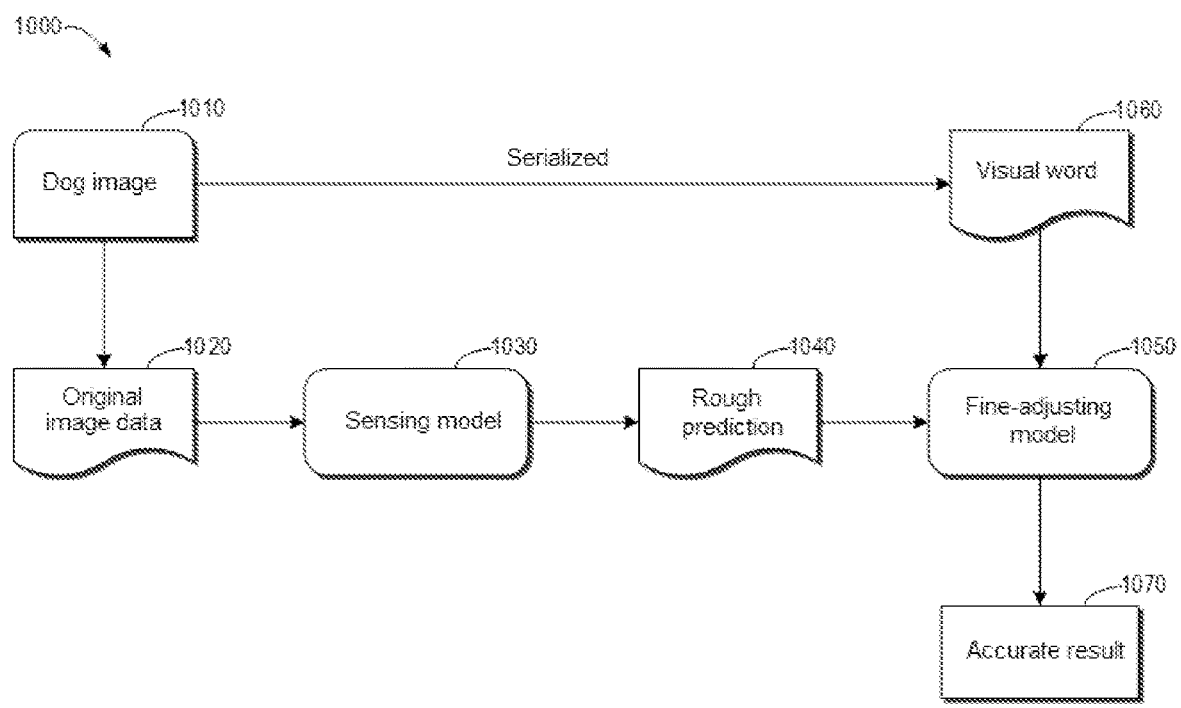
FIG. 10 shows a schematic diagram of a use example applied to an image classification scenario according to an embodiment of the present disclosure.

FIG. 10 shows a schematic diagram of use example 1000 applied to an image classification scenario according to an embodiment of the present disclosure. As shown in FIG. 10, in use example 1000 of image classification, a data processing task is to recognize an object in an image. In the example of FIG. 10, dog image 1010 may be provided to sensing model 1030 (e.g., a compressed image classification model) in the form of original image data 1020. It should be noted that sensing model 1030 may be an example of first data processing model 112 in FIG. 1. For example, sensing model 1030 may be deployed in first electronic device 110 having a small amount of computing resources (e.g., an edge device), occupies a small amount of computing resources, and thus can only provide a recognition result with a low accuracy (also referred to as a prediction result). Therefore, sensing model 1030 may process original image data 1020 to obtain rough prediction 1040, which may be an example of initial result 115 described above. For example, since sensing model 1030 may be a model occupying a small amount of computing resources and having limited recognition capability, sensing model 1030 may merely recognize a dog figure existing in original image data 1020.

In some cases, rough prediction 1040 may not be accurate enough to complete the task of recognizing the object in the image. In order to obtain a more accurate recognition result, rough prediction 1040 may be further provided to fine-adjusting model 1050. It should be noted that fine-adjusting model 1050 may be an example of second data processing model 122 in FIG. 1. For example, fine-adjusting model 1050 may be deployed in second electronic device 120 having more computing resources (e.g., a cloud device), occupies more computing resources, and thus can provide a recognition result with a higher accuracy (also referred to as a prediction result). Therefore, fine-adjusting model 1050 may adjust rough prediction 1040 to obtain accurate result 1070, which may be an example of adjusted result 125 described above. For example, since fine-adjusting model 1050 is a model occupying more computing resources and having more powerful functions, more dog-related information recorded in dog image 1010 may be recognized in accurate result 1070, such as a specific type of the dog, a color of the dog, an action of the dog, or any other related features of the dog.

As shown in FIG. 10, in some embodiments, in order to make fine-adjusting model 1050 obtain accurate result 1070, dog image 1010 may be serialized to visual word 1060 for describing content of dog image 1010. It should be noted that visual word 1060 may be an example of word information 625 described above with respect to FIG. 6B. For example, visual word 1060 may be used for describing any dog-related information presented in dog image 1010, such as the action being performed by the dog in image 1010. Thus, based on both rough prediction 1040 and visual word 1060, fine-adjusting model 1050 may more accurately and more efficiently provide accurate result 1070. It should be noted that in this case, a time delay for transmitting visual word 1060 may be much less than a time delay for transmitting dog image 1010, which is also one of the thoughts of embodiments of the present disclosure: only transmitting "small content" and trying to use huge resources in high-capacity devices (e.g., cloud devices).

In some embodiments, first electronic device 110 implementing sensing model 1030 may serialize dog image 1010, thereby providing visual word 1060. In other embodiments, dog image 1010 may also be serialized by a device other than first electronic device 110 and second electronic device 120. In addition, in some embodiments that are not shown in FIG. 10, visual word 1060 may not be provided to second electronic device 120 by first electronic device 110, but may be obtained through second-stage processing of accurate result 1070 by second electronic device 120 based on fine-adjusting model 1050. In such an embodiment, visual word 1060 may be an example of final result 605 described above with respect to FIG. 6A and FIG. 7.

Figure 11:
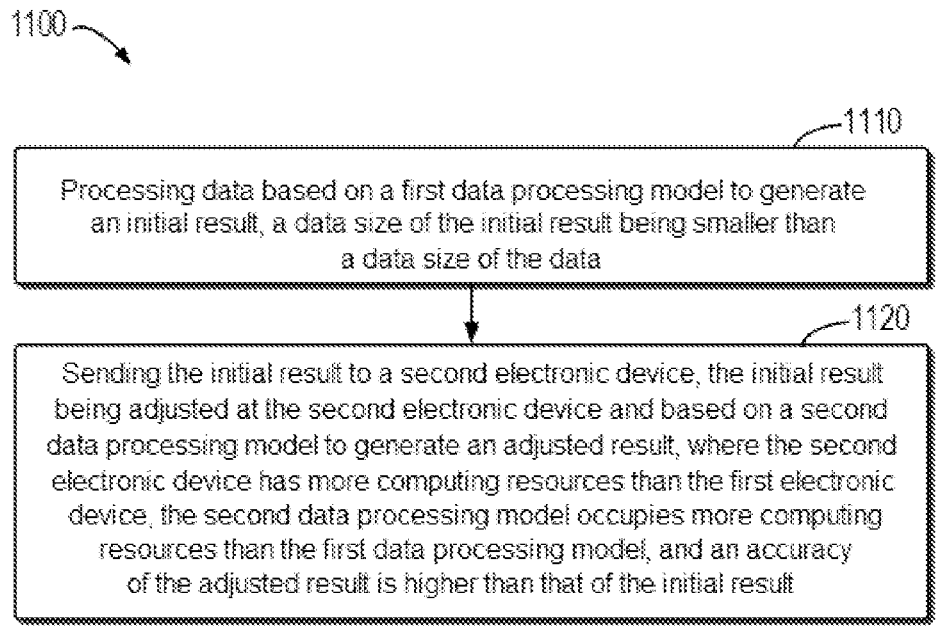
FIG. 11 shows an example flow chart of a method for data processing according to an embodiment of the present disclosure.

FIG. 11 shows an example flow chart of method 1100 for data processing according to an embodiment of the present disclosure. In some embodiments, method 1100 may be implemented by first electronic device 110 in example environment 100, for example, may be implemented by a processor or processing unit of first electronic device 110, or by various functional modules of first electronic device 110. In other embodiments, method 1100 may also be implemented by a computing device or electronic device independent of example environment 100, or may be implemented by other units or modules in example environment 100. For ease of description, method 1100 will be described with reference to FIG. 1.

At block 1110, first electronic device 110 processes data 105 based on first data processing model 112 to generate initial result 115, a data size of initial result 115 being smaller than a data size of data 105. At block 1120, first electronic device 110 sends initial result 115 to second electronic device 120, and initial result 115 is adjusted at second electronic device 120 and based on second data processing model 122 to generate adjusted result 125, where second electronic device 120 has more computing resources than first electronic device 110, second data processing model 122 occupies more computing resources than first data processing model 112, and an accuracy of adjusted result 125 is higher than that of initial result 115.

In some embodiments, first electronic device 110 sending initial result 115 to second electronic device 120 may include: first electronic device 110 sending initial result 115 to second electronic device 120 if first electronic device 110 determines that a confidence degree of initial result 115 is less than a threshold. In some embodiments, first electronic device 110 processing data 105 based on first data processing model 112 may include: first electronic device 110 processing data 105 to generate initial result 115 in a word form. In some embodiments, method 1100 may further include: first electronic device 110 generating word information for describing content of data 105, and first electronic device 110 sending the word information to second electronic device 120.

In some embodiments, method 1100 may further include: first electronic device 110 receiving adjusted result 125 from second electronic device 120. In some embodiments, method 1100 may further include: first electronic device 110 receiving a final result from second electronic device 120, the final result being generated by second electronic device 120 based on adjusted result 125. In some embodiments, first data processing model 112 and second data processing model 122 may be obtained by joint training. In some embodiments, first data processing model 112 may include a compressed model, and second data processing model 122 may include a language model. In some embodiments, first electronic device 110 may include an edge device, and second electronic device 120 may include a cloud device. In some embodiments, data 105 may include at least one of an image, a video, and a voice.

Figure 12:
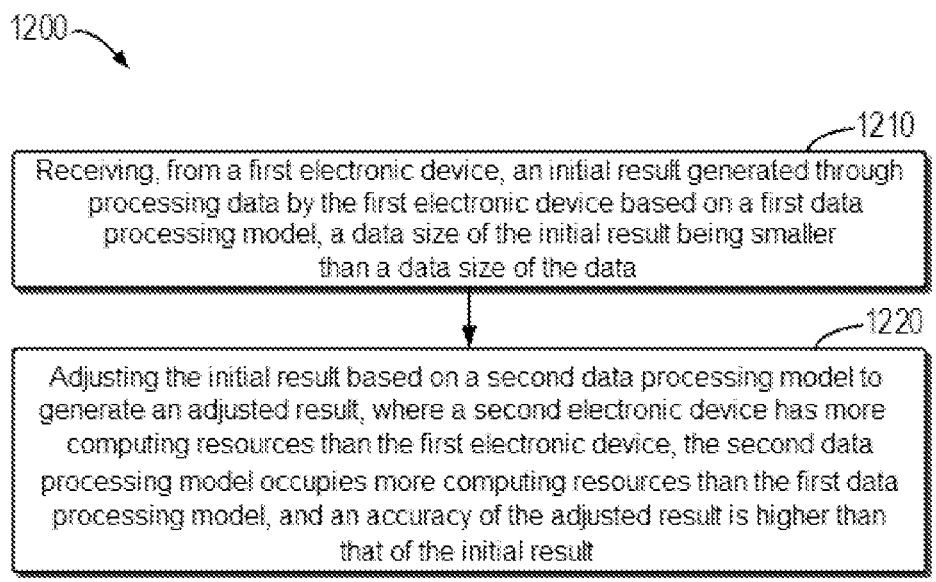
FIG. 12 shows an example flow chart of another method for data processing according to an embodiment of the present disclosure.

FIG. 12 shows an example flow chart of another method 1200 for data processing according to an embodiment of the present disclosure. In some embodiments, method 1200 may be implemented by second electronic device 120 in example environment 100, for example, may be implemented by a processor or processing unit of second electronic device 120, or by various functional modules of second electronic device 120. In other embodiments, method 1200 may also be implemented by a computing device or electronic device independent of example environment 100, or may be implemented by other units or modules in example environment 100. For ease of description, method 1200 will be described with reference to FIG. 1.

At block 1210, second electronic device 120 receives from first electronic device 110 initial result 115 generated through processing data 105 by first electronic device 110 based on first data processing model 112, a data size of initial result 115 being smaller than a data size of data 105. At block 1220, second electronic device 120 adjusts initial result 115 based on second data processing model 122 to generate adjusted result 125, where second electronic device 120 has more computing resources than first electronic device 110, second data processing model 122 occupies more computing resources than first data processing model 112, and an accuracy of adjusted result 125 is higher than that of initial result 115.

In some embodiments, initial result 115 may be in a word form. In some embodiments, second electronic device 120 adjusting initial result 115 based on second data processing model 122 may include: second electronic device 120 receiving word information for describing content of data 105 from first electronic device 110, and second electronic device 120 generating adjusted result 125 based on the word information and initial result 115. In some embodiments, method 1200 may further include: second electronic device 120 sending adjusted result 125 to first electronic device 110. In some embodiments, method 1200 may further include: second electronic device 120 processing adjusted result 125 based on second data processing model 122 to generate a final result, and sending the final result to first electronic device 110.

In some embodiments, first data processing model 112 and second data processing model 122 may be obtained by joint training. In some embodiments, first data processing model 112 may include a compressed model, and second data processing model 122 may include a language model. In some embodiments, first electronic device 110 may include an edge device, and the second electronic device may include a cloud device. In some embodiments, data 105 may include at least one of an image, a video, and a voice.

Figure 13:
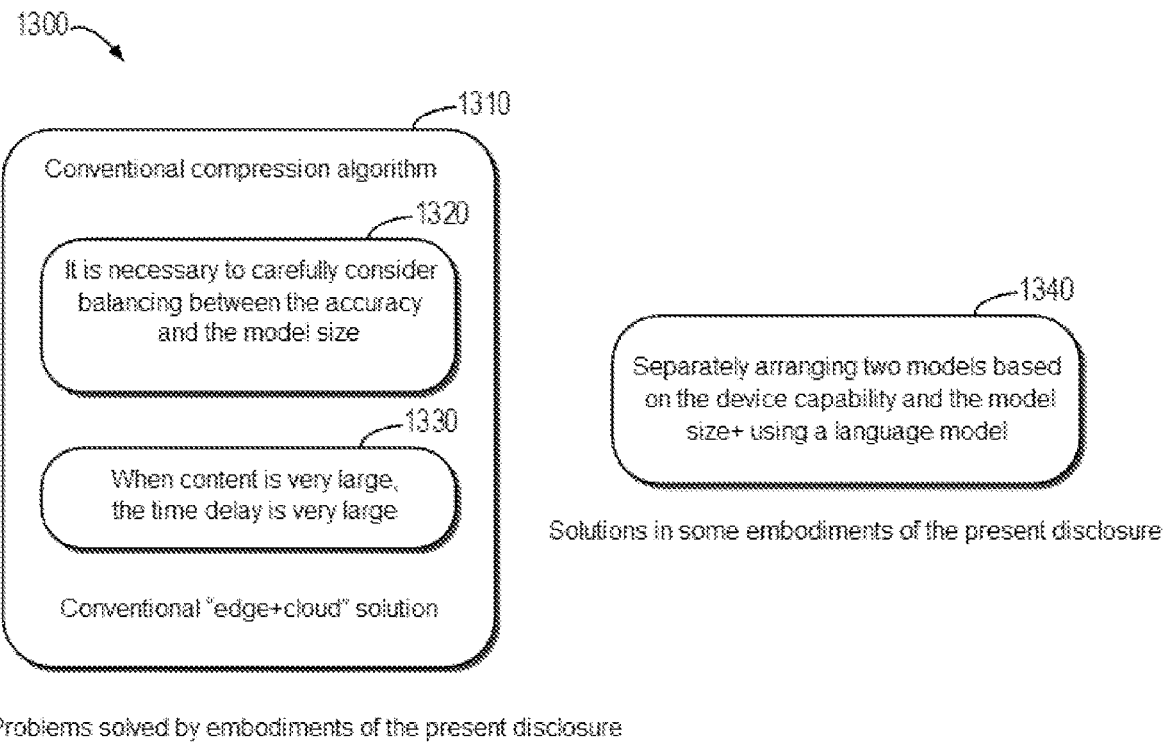
FIG. 13 shows a graphical representation of a technical advantage of embodiments according to the present disclosure over a conventional solution.

FIG. 13 shows graphical representation 1300 of a technical advantage of embodiments according to the present disclosure over a conventional solution. In FIG. 13, block 1310 represents two conventional solutions related to the embodiments of the present disclosure, i.e., a conventional model compression algorithm and a conventional "edge+cloud" solution. As shown in FIG. 13, in the conventional compression algorithm, there is problem 1320, i.e., it is necessary to carefully consider balancing between a model accuracy and a model size. In the conventional "edge+cloud" solution, there is problem 1330, i.e., when a data size of to-be-processed content is very large, transmitting the content from an edge device to a cloud device will lead to a huge time delay. The problems existing in these conventional solutions are all well solved by embodiments of the present disclosure. As indicated in block 1340, the solutions of some embodiments of the present disclosure separately arrange two models based on a device capability and a model size, thereby solving problem 1320. There is no need to balance between the accuracy and the model size, both of which are optimal. In addition, only an initial result of a smaller data size than original data is transmitted between the two models, thereby solving problem 1330. In particular, in some embodiments, a language model may be used at a cloud device, and therefore, an edge device only needs to transmit word or text content of a very small data size to the cloud device.

In general, the embodiments of the present disclosure have solved various problems in conventional methods, and presented a novel fine-adjusting method based on separate two stage data processing models. Specifically, main contributions of the embodiments of the present disclosure may be described in detail as follows. First, a separable model is described. In the embodiments of the present disclosure, the separate models may avoid the accuracy redundancy and adjust the model accuracy in a flexible manner. Model separation also makes it possible to realize the two-stage fine-adjusting process in a rear stage data processing model. In addition, different from an end-to-end solution, in the algorithm of the embodiments of the present disclosure, while the model may still be trained as a whole, the model may also be split into two portions (e.g., a sensing model and a fine-adjusting model). The two portions may be optimized in a flexible manner to achieve a high accuracy, the fine-adjusting model may be very large, and a higher space efficiency may be achieved by model compression.

Then, an offloading strategy is described. To deploy the two separate models, it is necessary to consider a model size, a transfer problem, and other factors, to design a model distribution strategy for solving a model separation problem. A good strategy is the basis of the space and time efficiency of the algorithm of the embodiments of the present disclosure. In addition, a confidence degree of a processing result provided by a compressed model may be computed using some indicators, to determine whether the subsequent fine-adjusting process is necessary. For example, only a result determined to be inaccurate will be transmitted to a cloud to obtain a better result. A novel edge offloading ("edge+cloud" mode) strategy is also presented as a comprehensive strategy for edge offloading. For model distribution, a large model with an input and an output of small data sizes is deployed in the cloud, and a small model with an input and an output of large data sizes is deployed on the edge device. This can achieve both the space efficiency and the time efficiency.

Then, a two-stage fine-adjusting process based on a language model is described. The two-stage fine-adjustment of the language model makes full use of the language model. The algorithm may help to compensate for the loss of model compression and further improve the result. Even if a compressed model has an accuracy similar to an accuracy of an original model, the result will also be better than that only using the compressed model. The result of finely adjusting the compressed model using the language model may obtain a higher accuracy, and the language model may also improve the result to obtain a more comprehensive, meaningful, and reliable result, thereby obtaining better system performance. Additionally providing the language model may have a higher benefit in respect of both accuracy and storage efficiency, compared with directly finely adjusting the original model. Finally, a general framework is described. Embodiments of the present disclosure may be easily promoted to most tasks of a low-capacity device (e.g., the edge device) using the compressed model, especially a task including a sensing portion and an understanding portion (or the sensing model and the fine-adjusting model), such as the mind map recombination described above. The sensing portion recognizes the mind map from an image, and the understanding portion makes the mind map better.

In general, in some embodiments of the present disclosure, a fine-adjusting algorithm based on two stage data processing models is presented, and the effectiveness of the algorithm of the embodiment of the present disclosure is guaranteed by, e.g., model distribution or model separation. The algorithm has a high generalization capacity, and may be easily applied to many scenarios, as long as these scenarios may be split into a rough sensing portion and a smart fine-adjusting portion. In addition, regarding the embodiments of the present disclosure, it is still worth indicating the following points.

First, assuming that the compressed model will always reduce the accuracy, it should be noted that there will always be a point in the process of model compression, and after this point, the model accuracy will sharply decline. Under an ideal condition, perhaps a good model compression result may be found. The model is compressed whilst maintaining good performance, but the real world is not always ideal. In addition, it is impossible to always find such an alternative network as SqueezeNet in all fields. Therefore, in these cases, the embodiments of the present disclosure may be a good alternative. In particular, the embodiments of the present disclosure may provide a novel available compression option for the worst compression condition. While the first-stage model of two stage models may have larger compression loss, the embodiments of the present disclosure may compensate for the compression loss using some approaches, e.g., exchanging cloud resources for the compression efficiency.

Then, regarding the transmission delay problem, the embodiment of the present disclosure only transmits "content of a small data size" between separate models. For example, the low-capacity device (e.g., the edge device) may acquire an image, process the image to obtain a rough prediction, and then transmit the small rough prediction to a high-capacity device (e.g., the cloud device). A model of the high-capacity device (e.g., the cloud device) may compensate for the loss caused by model compression of the low-capacity device (e.g., the edge device). Finally, an improved result (a data size of which is also small) may be transferred back to the low-capacity device (e.g., the edge device). Further, the embodiments of the present disclosure may relate to any data processing task. An object of the embodiments of the present disclosure is to find a better strategy to deploy a model (e.g., the compressed model) of a low accuracy in a low-capacity device (e.g., the edge device), and optical character recognition (OCR) is just an example use. In addition, compressing a model using the language model is also a good logic, i.e., in the worst case of model compression (e.g., the compression will result in large loss), the embodiments of the present disclosure may find a method for making a processing result better, while maintaining a smaller model size and a smaller transmission delay on the low-capacity device.

Figure 14:
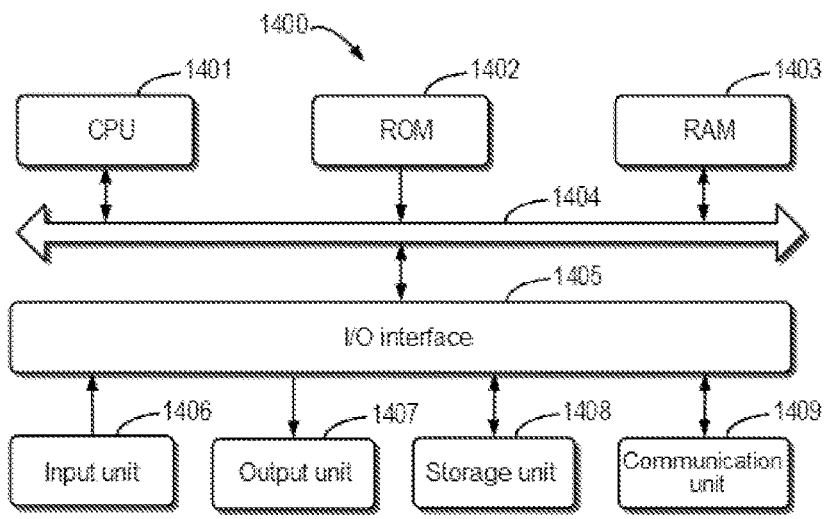
FIG. 14 shows a block diagram of an example device that may be configured to implement embodiments of the present disclosure.

FIG. 14 shows a block diagram of example device 1400 that may be configured to implement embodiments of the present disclosure. In some embodiments, device 1400 may be an electronic device, which may be configured to implement first electronic device 110 or second electronic device 120 in FIG. 1. As shown in FIG. 14, device 1400 includes central processing unit (CPU) 1401, which may execute various appropriate actions and processing in accordance with computer program instructions stored in read-only memory (ROM) 1402 or computer program instructions loaded into random access memory (RAM) 1403 from storage unit 1408. In RAM 1403, various programs and data required for the operation of storage device 1400 may also be stored. CPU 1401, ROM 1402, and RAM 1403 are connected to each other through bus 1404. Input/output (I/O) interface 1405 is also connected to bus 1404.

A plurality of components in device 1400 is connected to I/O interface 1405, including: input unit 1406, such as a keyboard and a mouse; output unit 1407, such as various types of displays and speakers; storage unit 1408, such as a magnetic disk and an optical disk; and communication unit 1409, such as a network card, a modem, and a wireless communication transceiver. Communication unit 1409 allows device 1400 to exchange information/data with other devices through a computer network such as the Internet and/or various telecommunication networks.

The various processes and processing described above, such as example methods or example processes, may be performed by CPU 1401. For example, in some embodiments, various example methods or example processes may be implemented as a computer software program that is tangibly included in a machine-readable medium, such as storage unit 1408. In some embodiments, part or all of the computer program may be loaded and/or installed onto device 1400 via ROM 1402 and/or communication unit 1409. When a computer program is loaded into RAM 1403 and executed by CPU 1401, one or more steps of the example method or example process described above may be executed.

As used herein, the term "include" and similar terms thereof should be understood as open-ended inclusion, that is, "including but not limited to." The term "based on" should be construed as "at least partially based on." The term "an embodiment" or "the embodiment" should be construed as "at least one embodiment." The terms "first," "second," and the like may refer to different or identical objects. Other explicit and implicit definitions may be further included herein.

As used herein, the term "determining" covers various actions. For example, the "determining" may include operating, computing, processing, outputting, investigating, finding (e.g., finding in a table, a database or another data structure), ascertaining, and the like. In addition, the "determining" may include receiving (e.g., receiving information), accessing (e.g., accessing data in a memory), and the like. In addition, the "determining" may include analyzing, selecting, choosing, establishing, and the like.

It should be noted that the embodiments of the present disclosure may be implemented by hardware, software, or a combination of software and hardware. The hardware portion may be implemented using a dedicated logic. The software portion may be stored in a memory and executed by a suitable instruction execution system, such as a microprocessor or dedicated designed hardware. Those skilled in the art may understand that the above device and method may be implemented using a computer executable instruction and/or by being contained in a processor control code. For example, such a code is provided in a programmable memory or a data carrier such as an optical or electronic signal carrier.

Further, while the operations of the method in the present disclosure are described in a particular sequence in the accompanying drawings, this does not require or imply that these operations must be executed in the particular sequence, or all shown operations must be executed to achieve the desired result. On the contrary, the execution sequence of the steps depicted in the flow charts may be changed. Additionally or alternatively, some steps may be omitted, a plurality of steps may be combined into one step for execution, and/or one step may be decomposed into a plurality of steps for execution. It should be further noted that the features and functions of two or more apparatuses according to the present disclosure may be embodied in one apparatus. Conversely, the features and functions of one apparatus described above may be further divided for embodiment by a plurality of apparatuses.

While the present disclosure is described with reference to some specific embodiments, it should be understood that the present disclosure is not limited to the disclosed specific embodiments. The present disclosure is intended to cover various modifications and equivalent arrangements included in the spirit and scope of the appended claims.

What is claimed is:

1. A method for data processing, comprising:
processing data at a first electronic device and based on a first data processing model to generate an initial result, a data size of the initial result being smaller than a data size of the data, the first electronic device comprising an edge device of an edge portion of an edge-cloud network, the edge device being coupled between a user device and a cloud portion of the edge-cloud network; and
sending the initial result to a second electronic device, the initial result being adjusted at the second electronic device and based on a second data processing model to generate an adjusted result, the second electronic device comprising a cloud device of the cloud portion of the edge-cloud network;
wherein the second electronic device has more computing resources than the first electronic device, the second data processing model occupies more computing resources than the first data processing model, and an accuracy of the adjusted result is higher than that of the initial result; and
wherein the first and second electronic devices are deployed in the respective edge and cloud portions of the edge-cloud network and implement the respective first and second data processing models as respective first and second sequential stages of a separable multi-stage data processing model, the first sequential stage comprising a sensing stage of the separable multi-stage data processing model and the second sequential stage comprising a fine-adjusting stage of the separable multi-stage data processing model.

2. The method according to claim 1, wherein sending the initial result to the second electronic device comprises:
sending the initial result to the second electronic device if it is determined that a confidence degree of the initial result is less than a threshold.

3. The method according to claim 1, wherein processing the data based on the first data processing model comprises:
processing the data to generate the initial result in a word form.

4. The method according to claim 1, further comprising:
generating in the first electronic device at least one signal characterizing content of the data; and
sending the at least one signal from the first electronic device to the second electronic device over a communication link.

5. The method according to claim 1, further comprising:
receiving the adjusted result from the second electronic device.

6. The method according to claim 1, further comprising:
receiving a final result from the second electronic device, the final result being generated by the second electronic device based on the adjusted result.

7. The method according to claim 1, wherein the first data processing model and the second data processing model are obtained by joint training.

8. The method according to claim 1, wherein the first data processing model comprises a compressed model, and the second data processing model comprises a language model.

9. The method according to claim 1, wherein the data comprises at least one of an image, a video, and a voice.

10. A computer program product that is tangibly stored on a non-transitory computer-readable medium and comprises machine-executable instructions, wherein the machine-executable instructions, when executed by a machine, cause the machine to execute steps of the method according to claim 1.

11. A method for data processing, comprising:
receiving, from a first electronic device at a second electronic device, an initial result generated through processing data by the first electronic device based on a first data processing model, a data size of the initial result being smaller than a data size of the data, the first electronic device comprising an edge device of an edge portion of an edge-cloud network, the edge device being coupled between a user device and a cloud portion of the edge-cloud network; and
adjusting the initial result based on a second data processing model at the second electronic device to generate an adjusted result, the second electronic device comprising a cloud device of the cloud portion of the edge-cloud network;
wherein the second electronic device has more computing resources than the first electronic device, the second data processing model occupies more computing resources than the first data processing model, and an accuracy of the adjusted result is higher than that of the initial result; and
wherein the first and second electronic devices are deployed in the respective edge and cloud portions of the edge-cloud network and implement the respective first and second data processing models as respective first and second sequential stages of a separable multi-stage data processing model, the first sequential stage comprising a sensing stage of the separable multi-stage data processing model and the second sequential stage comprising a fine-adjusting stage of the separable multi-stage data processing model.

12. The method according to claim 11, wherein the initial result is in a word form.

13. The method according to claim 11, wherein adjusting the initial result based on the second data processing model comprises:
receiving word information for describing content of the data from the first electronic device; and
generating the adjusted result based on the word information and the initial result.

14. The method according to claim 11, further comprising:
sending the adjusted result to the first electronic device.

15. The method according to claim 11, further comprising:
processing the adjusted result based on the second data processing model to generate a final result, and sending the final result to the first electronic device.

16. The method according to claim 11, wherein the first data processing model and the second data processing model are obtained by joint training.

17. The method according to claim 11, wherein the first data processing model comprises a compressed model, and the second data processing model comprises a language model.

18. A computer program product that is tangibly stored on a non-transitory computer-readable medium and comprises machine-executable instructions, wherein the machine-executable instructions, when executed by a machine, cause the machine to execute steps of the method according to claim 11.

19. A first electronic device, comprising:
at least one processor; and
at least one memory storing computer program instructions, the at least one memory and the computer program instructions being configured to cause, together with the at least one processor, the first electronic device to:
- process data based on a first data processing model to generate an initial result, a data size of the initial result being smaller than a data size of the data, the first electronic device comprising an edge device of an edge portion of an edge-cloud network, the edge device being coupled between a user device and a cloud portion of the edge-cloud network; and
- send the initial result to a second electronic device, the initial result being adjusted at the second electronic device and based on a second data processing model to generate an adjusted result, the second electronic device comprising a cloud device of the cloud portion of the edge-cloud network;

wherein the second electronic device has more computing resources than the first electronic device, the second data processing model occupies more computing resources than the first data processing model, and an accuracy of the adjusted result is higher than that of the initial result; and wherein the first and second electronic devices are deployed in the respective edge and cloud portions of the edge-cloud network and implement the respective first and second data processing models as respective first and second sequential stages of a separable multi-stage data processing model, the first sequential stage comprising a sensing stage of the separable multi-stage data processing model and the second sequential stage comprising a fine-adjusting stage of the separable multi-stage data processing model.

* * * * *